US008503944B2

(12) United States Patent
Harada et al.

(10) Patent No.: US 8,503,944 B2
(45) Date of Patent: Aug. 6, 2013

(54) SIGNAL DETECTION APPARATUS AND SIGNAL DETECTION METHOD FOR USE IN RADIO STATION OF RADIO COMMUNICATION SYSTEM

(75) Inventors: Hiroki Harada, Yokosuka (JP); Hiromasa Fujii, Yokosuka (JP); Shunji Miura, Yokohama (JP); Tomoyuki Ohya, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 388 days.

(21) Appl. No.: 12/975,975

(22) Filed: Dec. 22, 2010

(65) Prior Publication Data
US 2011/0165851 A1    Jul. 7, 2011

(30) Foreign Application Priority Data

Jan. 7, 2010   (JP) ................................ 2010-002293
Jul. 13, 2010  (JP) ................................ 2010-158926

(51) Int. Cl.
*H04B 17/00*    (2006.01)

(52) U.S. Cl.
USPC ............ 455/67.11; 455/91; 455/130; 455/39; 455/142; 370/328; 370/203; 370/310; 370/343; 370/329; 370/342; 375/147; 375/260; 375/148

(58) Field of Classification Search
USPC ........... 455/39, 67.11, 91, 130, 142; 370/328, 370/203, 310, 343, 329, 342; 375/147, 260, 375/148
See application file for complete search history.

(56) References Cited

U.S. PATENT DOCUMENTS

| 7,616,554 | B2 * | 11/2009 | Asai et al. | 370/203 |
|---|---|---|---|---|
| 2006/0209746 | A1 * | 9/2006 | Asai et al. | 370/328 |
| 2007/0226576 | A1 | 9/2007 | Ji et al. | |
| 2008/0026704 | A1 * | 1/2008 | Maeda et al. | 455/91 |
| 2008/0058975 | A1 * | 3/2008 | Visuri et al. | 700/100 |
| 2009/0003414 | A1 * | 1/2009 | Yellin | 375/147 |
| 2011/0085612 | A1 * | 4/2011 | Muraoka et al. | 375/260 |

FOREIGN PATENT DOCUMENTS

| CN | 1819541 A | 8/2006 |
|---|---|---|
| CN | 101013900 A | 8/2007 |
| CN | 101291165 A | 10/2008 |
| JP | 2003-209535 A | 7/2003 |

(Continued)

OTHER PUBLICATIONS

Local and Metropolitan Area Networks: Wireless Lan Medium Access Control (MAC) and Physical (PHY) Specifications, ANSI/IEEE Std 802.11, 1999 Edition, pp. 70-97.

(Continued)

*Primary Examiner* — April G Gonzales
(74) *Attorney, Agent, or Firm* — Oblon, Spivak, McClelland, Maier & Neustadt, L.L.P.

(57) ABSTRACT

A signal detection apparatus 23 for determining whether a detection target signal is included in a received radio signal, includes: a waveform feature amount calculation unit 31 configured to calculate a waveform feature amount $R_x^\alpha$ representing a waveform feature; a test statistic calculation unit 32 configured to calculate test statistic $Z_x^\alpha$ of each detection target signal by using the waveform feature amount; and a signal decision unit 33 configured to determine presence or absence of each detection target signal by comparing the test statistic $Z_x^\alpha$ of each detection target signal with a threshold $\Gamma$, wherein, under a condition where a specific detection target signal is removed, the test statistic calculation unit calculates a test statistic for a detection target signal which is not removed, and the signal decision unit determines presence or absence of the detection target signal by comparing the calculated test statistic with the threshold.

24 Claims, 14 Drawing Sheets

FOREIGN PATENT DOCUMENTS

| | | |
|---|---|---|
| JP | 2006-222665 | 8/2006 |
| JP | 2008-61214 | 3/2008 |
| WO | WO 2009/009461 A1 | 1/2009 |
| WO | WO 2009/145326 A1 | 12/2009 |

OTHER PUBLICATIONS

Amod V. Dandawate, et al., "Statistical Tests for Presence of Cyclostationarity", IEEE Transactions on Signal Processing, vol. 42, No. 9, Sep. 1994, pp. 2355-2369.

IEEE P802.22/DO.2, Nov. 2006, pp. 280-296.

Nobuyoshi Kikuma, "Adaptive Signal Processing with Array Antenna", Science and Technology Publishing Company, Inc., p. 22 and 175 (with Translation).

Office Action issued Jan. 8, 2013 in Japanese Patent Application No. 2010-158926 with English language translation.

Partial European Search Report issued Feb. 28, 2013 in Patent Application No. 10252193.7.

Office Action issued Apr. 2, 2013, in Chinese Patent Application No. 201110000646.6 (with English-language Translation), 17 pages.

\* cited by examiner

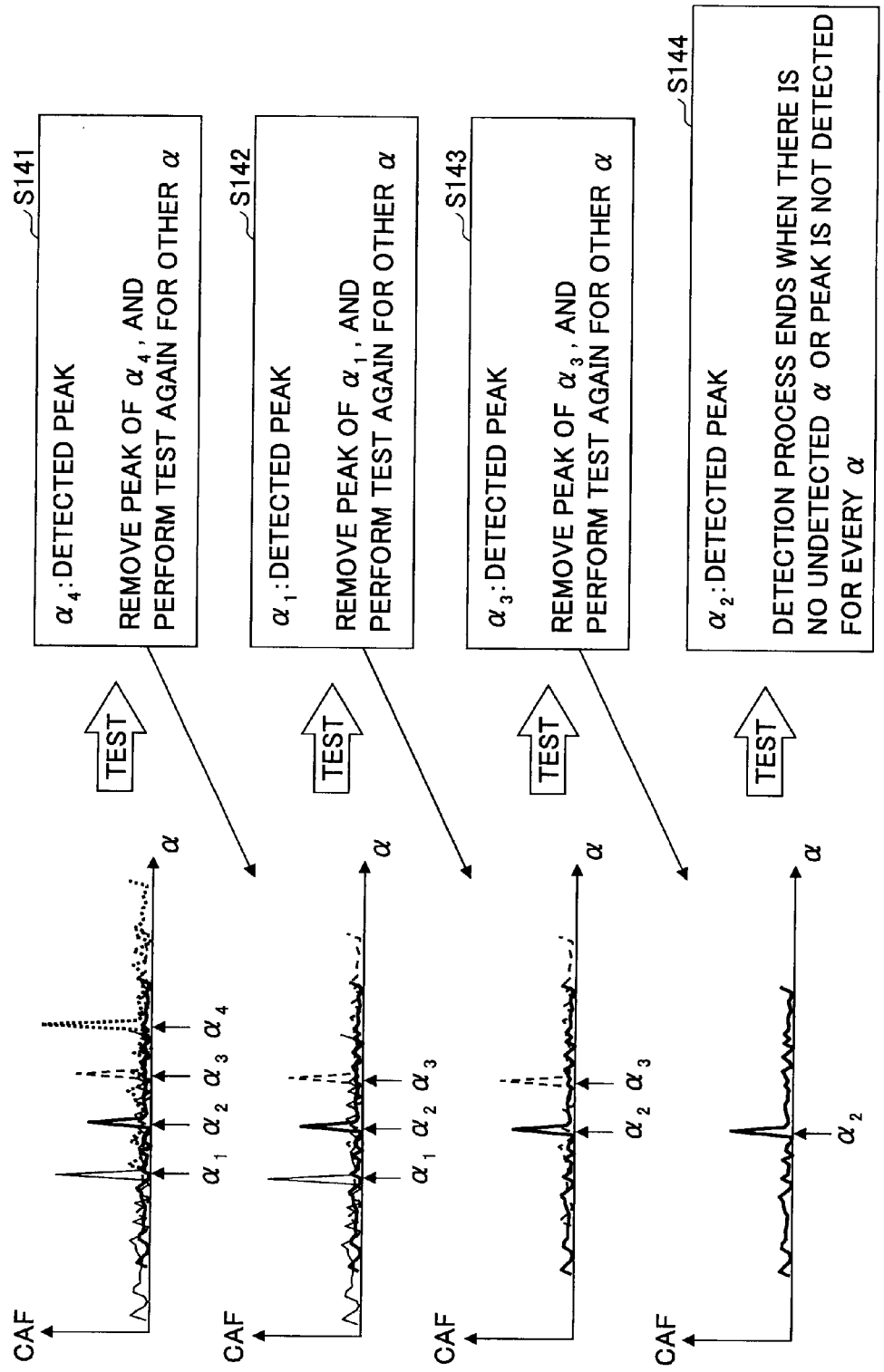

SIGNAL DETECTION APPARATUS AND SIGNAL DETECTION METHOD FOR USE IN RADIO STATION OF RADIO COMMUNICATION SYSTEM

BACKGROUND OF THE INVENTION

1. Field of the Invention

The present invention relates to a signal detection apparatus and a signal detection method in a radio station in an environment where a plurality of radio stations that share the same frequency band exist.

2. Description of the Related Art

In current radio communications, in many cases, a dedicated frequency band is assigned for each of radio communication systems to avoid mutual interference. However, in order to effectively utilize limited frequencies in radio communications, a method is being considered for using the same frequency band in a plurality of communication systems in recent years. Recently, cognitive radio technology is drawing attention as a scheme where a plurality of radio systems coexist in the same frequency band. In the cognitive radio technology, radio environment is recognized, so as to perform communication by setting transmission parameters such as center frequency, signal bandwidth, beam pattern and the like based on the recognition result and a rule for spectrum sharing. In particular, in an environment where a plurality of radio systems share the same frequency band, each cognitive radio apparatus needs to recognize use status of radio resources before starting transmission as accurately as possible in order to enhance frequency use efficiency while avoiding interference to a primary system and avoiding interference between cognitive systems.

As signal recognition techniques, there are power detection, matched filter detection, feature detection and the link. As a representative example using power detection, CSMA/CA (Carrier Sense Multiple Access with Collision Avoidance) scheme is known. This technique is described in the non-patent document 1, for example. In the CSMA/CA scheme which is used in radio LAN systems represented by IEEE802.11 standard, the reception level is measured before transmitting data to determine whether to transmit data. The patent document 1 and the non-patent document 2 disclose techniques in which each radio station performs detection of presence of a signal by calculating feature amount of cyclostationarity of the signal, and performs transmission only when the signal is not detected, so as to avoid interference. Such feature detection is a technique for utilizing statistical characteristics of the signal, and is advantageous in that advance information such as bandwidth and frame format is unnecessary, and that synchronization of time and frequency is unnecessary.

By using these techniques, it becomes possible that a radio station detects presence of a signal being used in adjacent areas, and performs transmission when it is determined that interference does not occur even when the same frequency band is shared among different radio communication systems.

RELATED ART DOCUMENT

[Patent document 1] Japanese Laid-Open Patent Application No. 2006-222665
[Patent document 2] Japanese Laid-Open Patent Application No. 2008-061214
[Non-patent document 1] Part 11: Wireless LAN Medium Access Control (MAC) and Physical Layer (PHY) specifications, ANSI/IEEE Std 802.11, 1999 Edition
[Non-patent document 2] A. V. Dandawate and G. B. Giannakis, "Statistical tests for presence of cyclostationarity," IEEE Trans. Signal Processing, vol. 42, no. 9, September 1994.
[Non-patent document 3] IEEE 802.22 Working Group of the LAN MAN Standards Committee, "IEEE P802.22/D0.1 Draft Standard for Wireless Regional Area Networks Part 22: Cognitive Wireless RAN Medium Access Control (MAC) and Physical Layer (PHY) specifications: Policies and procedures for operation in the TV bands", The Institute of Electrical and Electronics Engineers, May 2006.
[Non-patent document 4] Nobuyoshi Kikuma, "Adaptive signal processing by array antenna", Kagaku Gijutsu Shuppan, Inc.

Problem to be Solved by the Invention

In the CSMA/CA scheme of the conventional technique disclosed in the non-patent document 1, since the presence of the signal is determined only by the received power, it cannot be ascertained what kind of signal has been detected. As to the matched filter detection, it is necessary to prepare a template of a detection target signal in a receiver, and it is necessary that the detection target signal is completely known. On the other hand, in feature detection for utilizing statistical feature of the signal, it is possible to identify signals having different features with small amount of advance information. However, as shown in the non-patent document 2, there is a problem in that, when receiving a plurality of signals having different power, a feature of a weak signal is embedded in a feature of a strong signal so that detection ratio of the weak signal remarkably deteriorates.

SUMMARY OF THE INVENTION

A general object of the present invention is to provide a signal detection apparatus and a signal detection method for improving the detection ratio of feature detection in an environment where there are a plurality of detection target signals. More particularly, an object of the present invention is to provide a signal detection apparatus and a signal detection method for, even when a plurality of signals are received with different received powers simultaneously, detecting presence of each signal and recognizing the feature.

In an embodiment of the present invention, a signal detection apparatus for determining whether a detection target signal is included in a received radio signal is used. The signal detection apparatus includes:

a waveform feature amount calculation unit configured to calculate a waveform feature amount representing a waveform feature for each detection target signal;

a test statistic calculation unit configured to calculate test statistic of each detection target signal by using the waveform feature amount; and a signal decision unit configured to determine presence or absence of each detection target signal by comparing the test statistic of each detection target signal with a threshold, wherein, under a condition where a specific detection target signal is removed, the test statistic calculation unit calculates a test statistic for a detection target signal which is not removed, and the signal decision unit determines presence or absence of the detection target signal by comparing the calculated test statistic with the threshold.

According to the signal detection apparatus and a signal detection method of the present invention, detection ratio of feature detection can be improved in an environment where there are a plurality of detection target signals.

BRIEF DESCRIPTION OF THE DRAWINGS

FIG. 14 schematically shows the method of the first embodiment for comparison with the fourth embodiment.

Figure 1:
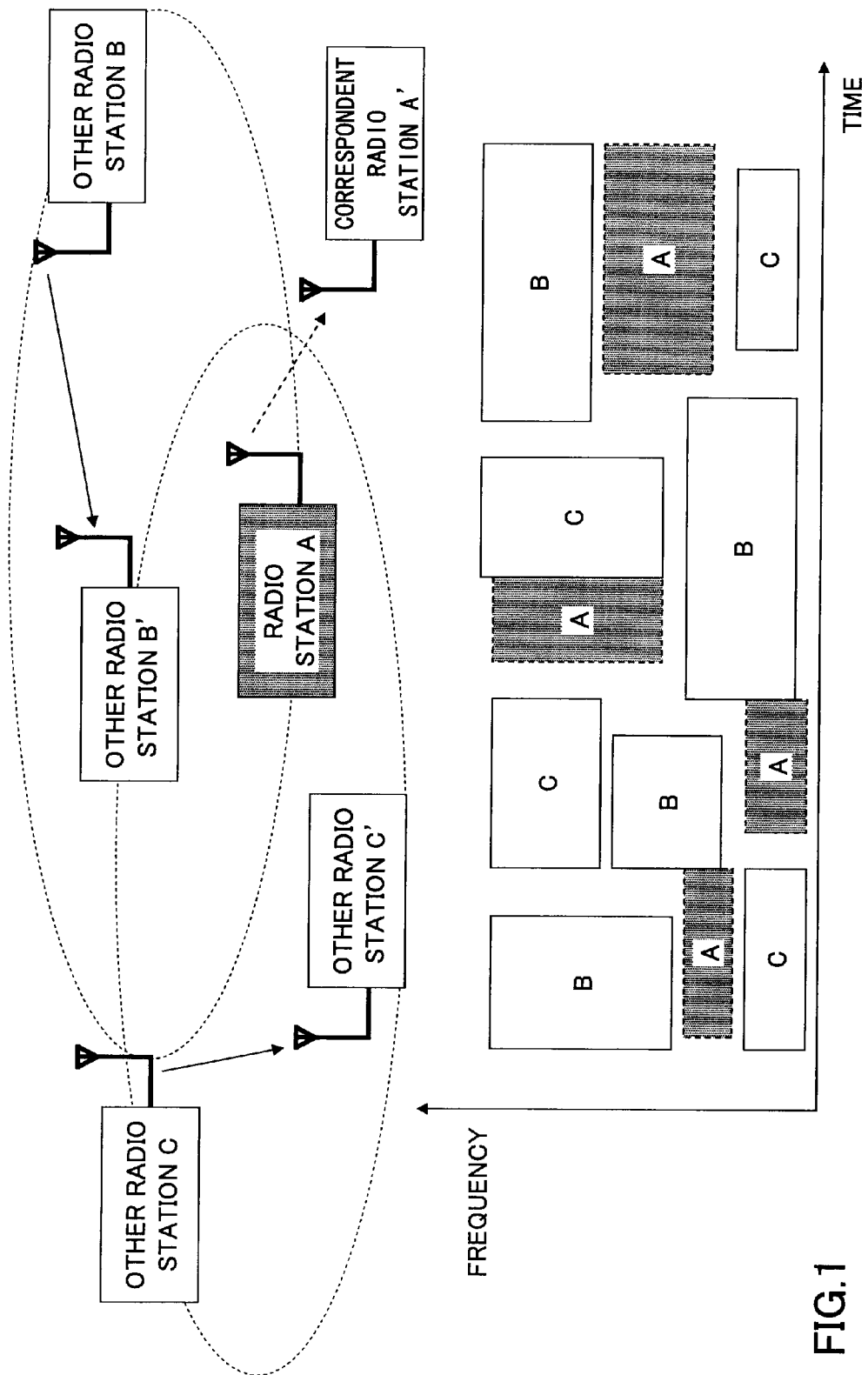
FIG. 1 is a conceptual diagram of a spectrum sharing environment by a plurality of radio stations.

DETAILED DESCRIPTION OF THE PREFERRED EMBODIMENTS (1) According to an embodiment of the present invention, a signal detection apparatus (23,63) for determining whether a detection target signal (s1, s2, ... ) is included in a received radio signal is used. The signal detection apparatus includes:

a waveform feature amount calculation unit (31, 74) configured to calculate a waveform feature amount (CAF, $R_x^{\alpha 1}$ (0), $R_x^{\alpha 2}$(0), ... ) representing a waveform feature for each detection target signal;

a test statistic calculation unit (32,75) configured to calculate test statistic ($Z_x^{\alpha 1}$, $Z_x^{\alpha 2}$, ... ) of each detection target signal by using the waveform feature amount; and a signal decision unit (33,76) configured to determine presence or absence of each detection target signal by comparing the test statistic of each detection target signal with a threshold ($\Gamma$), wherein, under a condition where a specific detection target signal is removed, the test statistic calculation unit calculates a test statistic for a detection target signal which is not removed, and the signal decision unit determines presence or absence of the detection target signal by comparing the calculated test statistic with the threshold.

As mentioned above, the statistic is calculated "under a condition where a specific detection target signal is removed", and presence or absence of the detection target signal is determined based on the calculated test statistic. According to the configuration, a signal which is difficult to detect due to a specific detection targets signal can be detected accurately. For example, after detecting presence of a signal of high reception level, by removing the detected signal, presence or absence of other signal having low reception level can be detected. Or, presence or absence of a target signal may be directly detected by calculating test statistic of the target candidate based on a signal obtained by removing (N−1) candidates among N candidates from the received signal.

(2) The waveform feature amount may be represented by a second order cyclic autocorrelation function (CAF) specified by a frequency parameter which indicates a cyclic frequency.

(3) The test statistic calculation unit may calculate a series ($\Sigma_x^\alpha$, $F_{f0, 0}(\omega)$) over a predetermined frequency range including a frequency parameter ($\alpha_1$, $\alpha_2$, ... ) of each detection target signal by using the waveform feature amount so as to calculate the test statistic for each detection target signal. Such test statistic is preferable for determining presence or absence of the detection target signal by using a likelihood ratio test method or a generalized likelihood ratio test (GLRT) method.

(4) When the signal decision unit detects presence of a first detection target signal, but does not detect presence of a second detection target signal, the test statistic calculation unit may re-calculate the series over the predetermined frequency range from which the first frequency parameter has been removed so as to re-calculate the test statistic of the second detection target signal, and the signal decision unit may determine presence or absence of the second detection target signal by comparing the re-calculated test statistic with the threshold.

This processing is preferable from the viewpoint of realizing the condition where the specific detection target signal is removed in the signal detection apparatus by removing an already detected signal from the calculation equation.

(5) A specific detection target signal having a specific cyclic frequency component may be removed from the radio signal based on autocorrelation of the specific detection target signal.

(6) The test statistic calculation unit may calculate the test statistic for the first candidate under a condition where signals other than the first candidate of the detection target signal are removed from the radio signal, and the test statistic calculation unit may calculate the test statistic for the second candidate under a condition where signals other than the second candidate of the detection target signal are removed from the radio signal, and the signal decision unit may determine presence or absence of the first candidate and presence or absence of the second candidate.

By suppressing signal components other than desired candidate using a filter, presence or absence of the desired candidate can be determined accurately. By performing such processing in parallel for the number of candidates, presence or absence of every candidate signal can be determined quickly.

(7) The test statistic of a frequency parameter ($\alpha_0$) may be calculated from a vector ($r_x^{\alpha 0} \equiv (\text{Re}\{R_x^{\alpha 0}(0)\}, \text{Im}\{R_x^{\alpha 0}(0)\})$) having a waveform feature amount specified by the frequency parameter and from a covariance matrix ($\Sigma_x^{\alpha 0}$) for the vector. Such test statistic is preferable for determining presence or absence of the detection target signal by using a likelihood ratio test method or a generalized likelihood ratio test (GLRT) method.

(8) The signal detection apparatus may further include a directivity control unit configured to control directivity for receiving the radio signal.

This configuration is preferable from the viewpoint of realizing the condition where the specific detection target signal is removed in the signal detection apparatus by controlling spatial directivity.

(9) The signal detection apparatus may further include a direction-of-arrival estimation unit configured to estimate an arrival direction of the radio signal. This configuration is preferable from the viewpoint of performing directivity control for directing null to a signal arriving from a specific direction.

(10) The signal detection apparatus may perform, for each of a plurality of arrival directions of the radio signal, processing for realizing directivity having null in a direction by the directivity control unit, processing for calculating test statistic by the test statistic calculation unit, and processing for determining presence or absence of the detection target signal by the signal decision unit. This configuration is preferable from the viewpoint of changing types of signals included in the received signal by changing the directivity to detect various signals.

(11) The signal detection apparatus may iteratively performs processing for calculating test statistic and processing for determining presence or absence of the detection target signal under a condition where a detection target signal whose presence has been detected is removed. This configuration is advantageous when signals having different received power are still included in the received signal even though signals of specific directions are suppressed.

(12) The signal decision unit may determine presence or absence of the detection target signal by using a likelihood ratio test method.

(13) According to an embodiment of the present invention, a signal detection method for determining whether a detection target signal is included in a received radio signal is used. The signal detection method includes the steps of:

calculating a waveform feature amount representing a waveform feature for each detection target signal;

calculating test statistic of each detection target signal by using the waveform feature amount; and determining presence or absence of each detection target signal by comparing the test statistic of each detection target signal with a threshold, wherein, under a condition where a specific detection target signal is removed, presence or absence of the detection target signal is determined by calculating a test statistic for a detection target signal which is not removed and by comparing the calculated test statistic with the threshold.

According to various embodiments of the present invention, even when the same frequency band is shared by different radio communication systems, the radio station accurately detects presence of a plurality of signals being used around the radio station, and performs transmission only when it is determined that interference does not occur. As a result, efficient spectrum sharing can be realized.

Embodiments of the present invention are described based on the following perspective.

1. First Embodiment
1.1 System
1.2 Radio Station and Signal Detection Apparatus
1.2.1 Waveform Feature Amount Calculation Unit
1.2.2 Test Statistic Calculation Unit
1.2.3 Signal Decision Unit
1.2.4 Iterative Detection Control Unit
1.3 Operation
2. Second Embodiment
2.1 Radio Station and Signal Detection Apparatus
2.2 Operation
3. Third Embodiment
3.1 Signal Detection Apparatus
3.2 Operation
4. Fourth Embodiment
4.1 Signal Detection Apparatus
4.2 Operation
4.3 Comparison of Operation 1. First Embodiment <1.1 System>

FIG. 1 shows a conceptual diagram of a spectrum sharing environment by a plurality of radio stations. The radio stations A, B and C may belong to a same system, or may belong to different systems. In any case, each radio station performs radio communication by using a part of the same frequency band. For example, the radio station A is starting to communicate with a correspondent radio station A', and at that time, the other radio stations B and C may be communicating with other radio stations B' and C' respectively. In order to avoid interference between radio stations sharing the same frequency band, the radio stations A and A' need to use a frequency band that other radio stations are not using. The radio station A detects presence or absence of a signal of the other radio stations B and C, and performs communication using resources (time, frequency, place, and the like) where no signal is detected. In this way, by dynamically controlling assignment of resources according to the communication status, use efficiency of resources can be improved.

<1.2 Radio Station and Signal Detection Apparatus>

Figure 2:
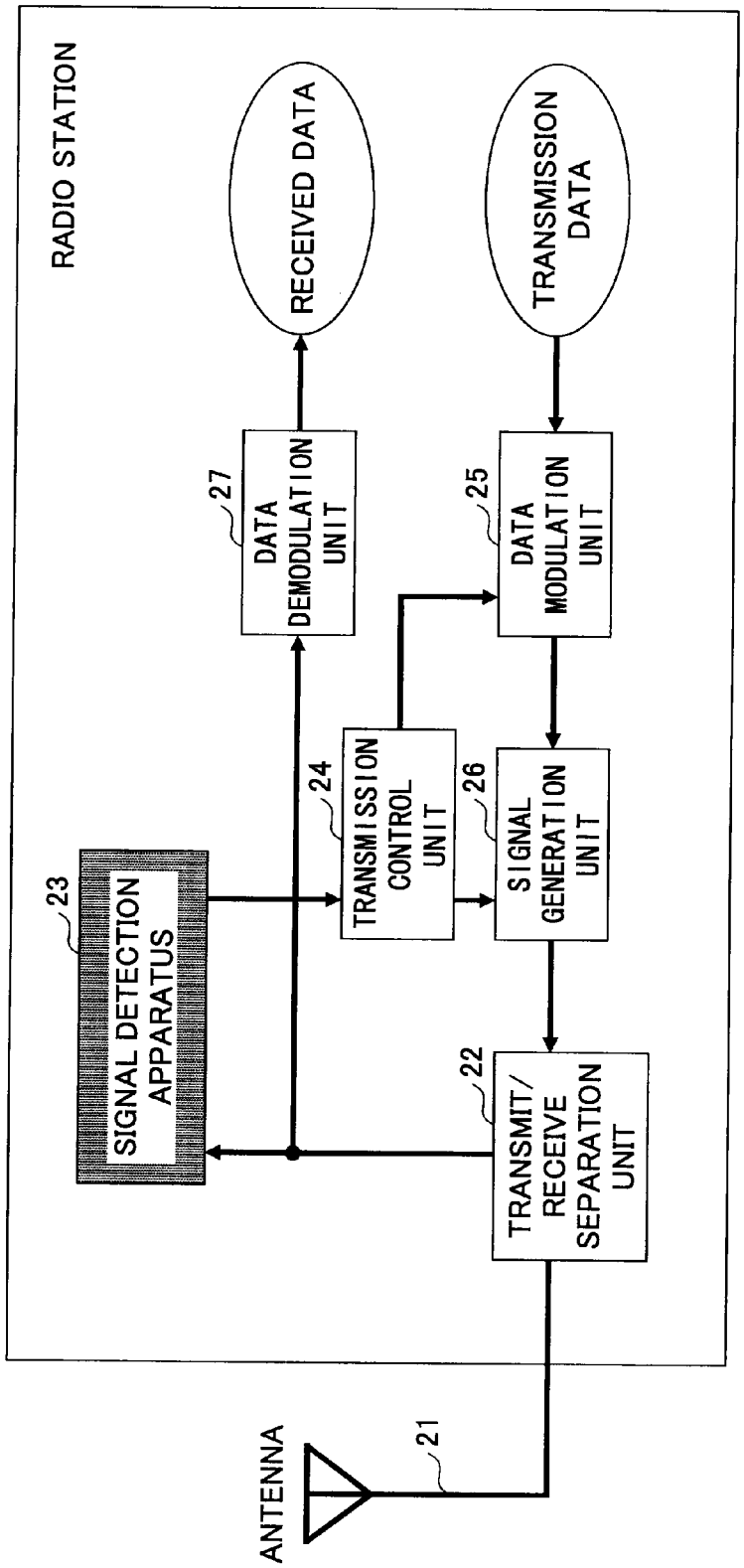
FIG. 2 is a block diagram of a radio station of a first embodiment of the present invention.

FIG. 2 is a block diagram of a radio station 11 of the first embodiment of the present invention. The radio station includes an antenna 21, a transmit/receive separation unit 22, a signal detection apparatus 23, a transmission control unit 24, a data modulation unit 25, a signal generation unit 26 and a data demodulation unit 27. The signal input to the antenna 21 of the radio station is input to the signal detection apparatus 23 via the transmit/receive separation unit 22. As described in detail in the following, the signal detection apparatus 23 detects whether a signal that should be considered (detection target signal) is included in the received signal. The transmission control unit 24 determines whether to transmit a signal based on the detection result by the signal detection unit 23. When a signal can be transmitted, the transmission control unit 24 determines parameters (data modulation scheme, frequency resource block, transmission power and the like) to be used for transmission. The determined parameters are reported to the data modulation unit 25. Transmission data from the radio station is modulated by the data modulation unit 25, and is converted to a radio signal by the signal generation unit 26. In actuality, not only data modulation but also processing such as channel coding and interleaving are performed. The transmission signal generated according to the parameters reported from the transmission control unit 24 is transmitted from the antenna 21 via the transmit/receive separation unit 22, and is carried to the correspondent radio station that is the other part of communication. After starting communication with the correspondent radio station, a signal received by the antenna 21 is demodulated by the data demodulation unit 27, so that received data from the correspondent radio station is obtained. More particularly, not only data demodulation but also channel decoding, deinterleaving and the like are performed.

Figure 3:
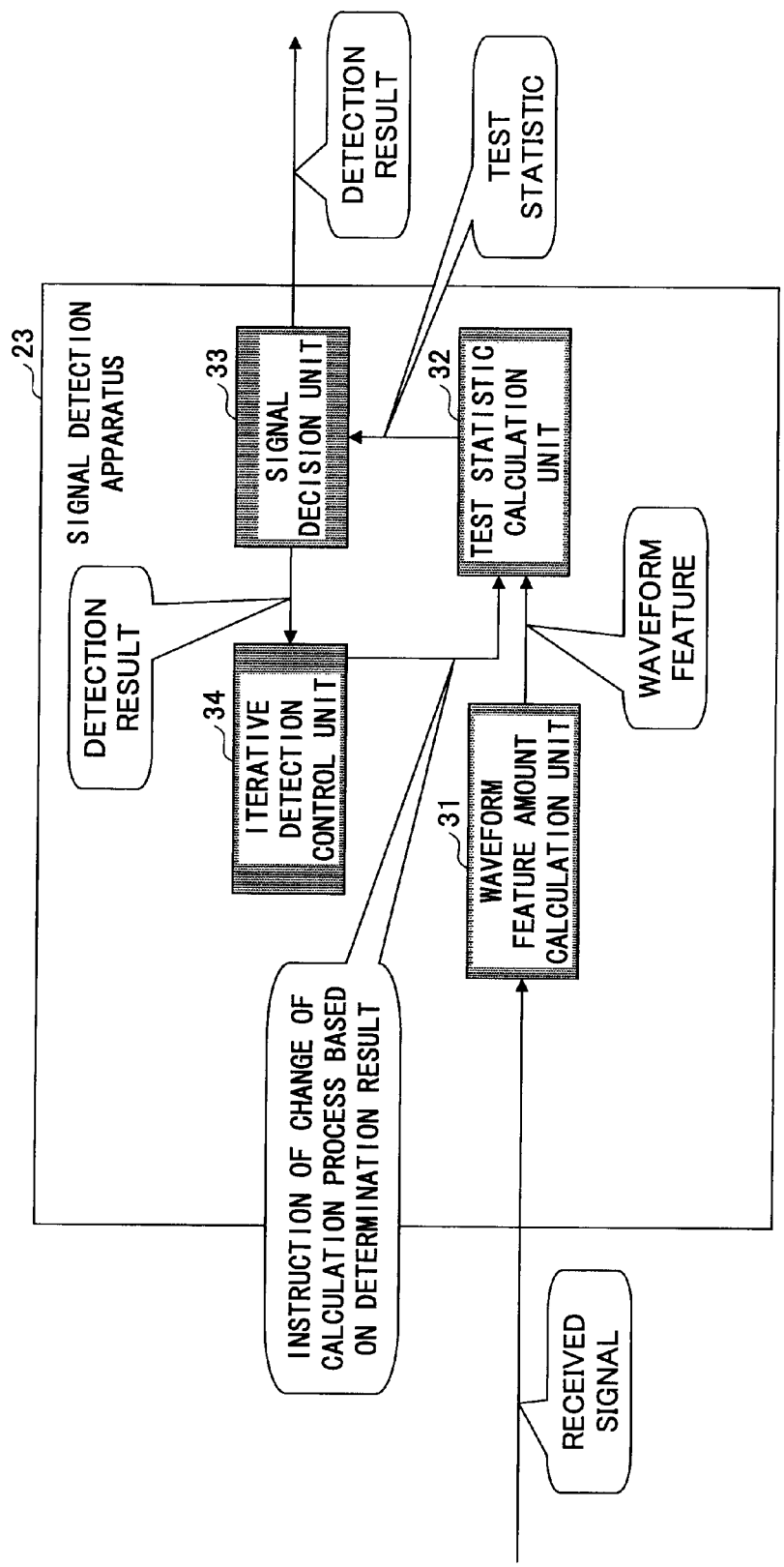
FIG. 3 is a block diagram of a signal detection apparatus of the first embodiment of the present invention.

FIG. 3 shows details of the signal detection apparatus 23 of the radio station shown in FIG. 2. The signal detection apparatus 23 includes a waveform feature amount calculation unit 31, a test statistic calculation unit 32, a signal decision unit 33, and an iterative detection control unit 34.

<1.2.1 Waveform Feature Amount Calculation Unit>

The waveform feature amount calculation unit 31 calculates a waveform feature amount for a signal (that is the received signal) input to the antenna 21. The waveform feature amount is information on statistical characteristics of the signal waveform. As the feature amount, cyclostationarity obtained by a second order cyclic autocorrelation value, a variance value of signal amplitude, a frequency correlation value and the like may be utilized.

In the following, the waveform feature amount is described.

The waveform of the signal is determined by various parameters such as center frequency, frequency bandwidth, transmission power, modulation scheme, transmission information symbol and the like. In other words, the signal waveform includes features of the parameters. For example, in the cases of the patent document 1 and the non-patent document 2, presence or absence of a signal is detected based on the feature amount of the cyclostationarity of the signal by calculating the cyclic autocorrelation function (CAF) value of the signal. This technique unitizes a property that the value of the cyclic autocorrelation function of the signal becomes large only when a specific parameter is used for calculating the value of the cyclic autocorrelation function due to the modulation scheme and the like used for the signal. In the patent document 2, a technique is proposed for providing different feature amounts of cyclostationarity to signals that use the same modulation scheme. These are merely examples, and the feature amount representing the feature of the signal waveform can be represented from various viewpoints such as correlation value and statistical value of the signal.

Figure 4:
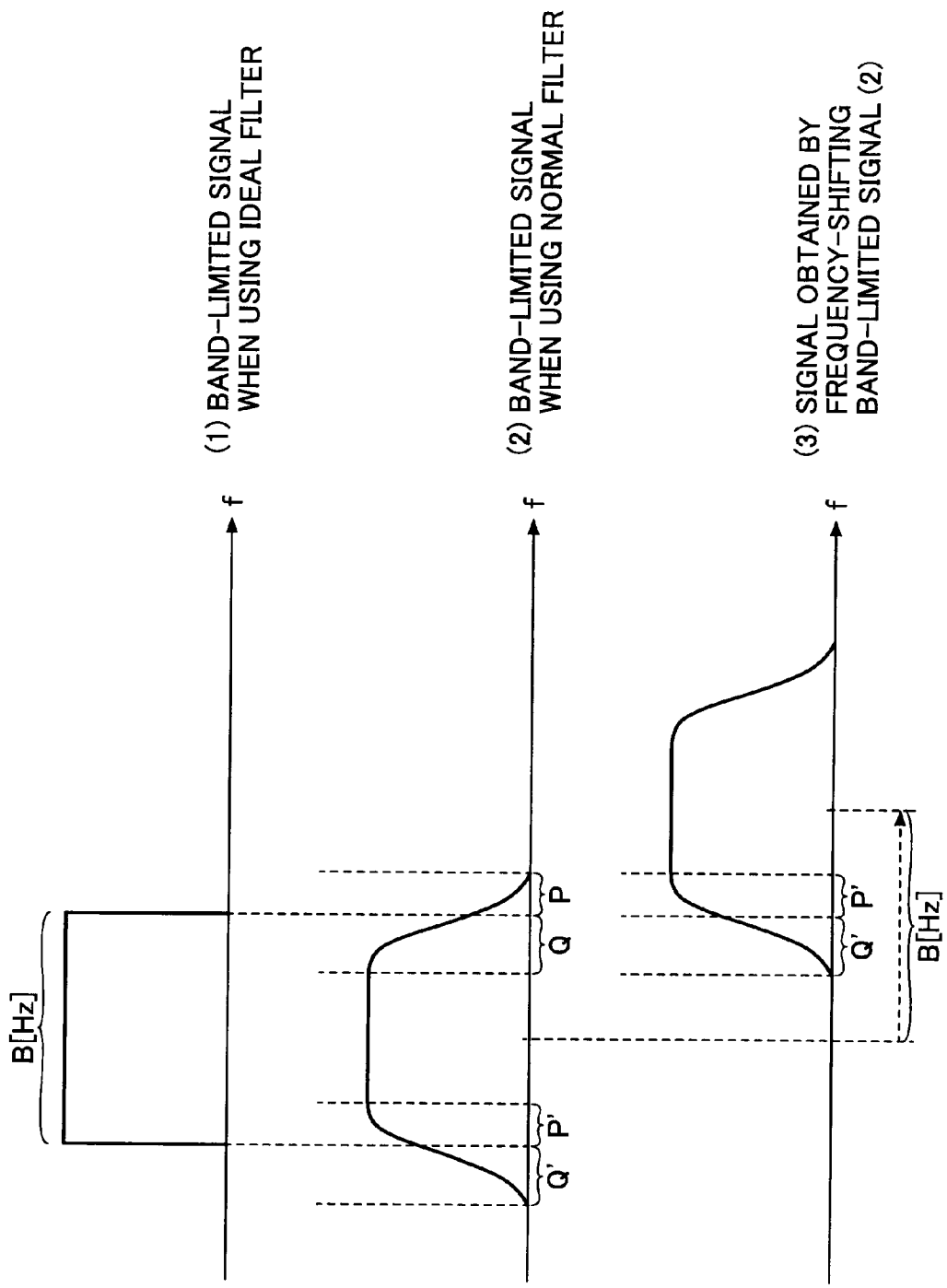
FIG. 4 is a diagram for explaining an example of waveform feature amount.

As an example of the feature amount of the signal, FIG. 4 is a diagram for explaining the feature amount of cyclostationarity arising due to the effect of a filter. "(1)" in FIG. 4 represents a frequency spectrum of a signal of bandwidth B [Hz] for which band limitation is applied using an ideal filter. When using the ideal filter, the frequency spectrum can be made rectangular. However, in actuality, it is difficult to realize such a steep spectrum. Therefore, normally, a filter of a frequency spectrum having gentle slope to some extent is used for band limitation. "(2)" of FIG. 4 represents a frequency spectrum when performing band limitation using a normal and realistic filter. As shown in "(2)" of FIG. 4, compared to the case where the ideal filter is used, frequency band widens by using the normally used band limitation filter. In the widened frequency band, the area, indicated by p, extending to the right side has the same signal components as the area indicated by P' in the left side, and the area, indicated by Q', extending to the left side has the same signal components as the area indicated by Q in the right side. Therefore, the part of P' in the signal (3) obtained by shifting the signal (2) by B [Hz] in frequency becomes the same signal components as P, and the part of Q' of (3) becomes the same signal components as Q, so that high correlation value can be obtained.

Accordingly, as to the signal which is band-limited by a filter, correlation (cyclic autocorrelation) occurs between the original signal and a signal obtained by frequency-shifting the original signal. The correlation value becomes the feature amount of the waveform. In the example shown in the figure, although correlation between a signal and a signal obtained by shifting the signal in the frequency direction is considered, it can be considered to shift the signal in the time direction in the same way. In the present embodiment, determination criterion (after mentioned test statistic) for determining presence or absence of the signal is calculated by using the correlation value so as to detect whether the received signal includes a signal of the system.

As statistical amount usable as the waveform feature amount, in addition to the cyclostationarity derived by calculating correlation value between a signal and a signal obtained by shifting the signal in a direction, a variance value of signal amplitude, that is, second order cumulant can be used. In general, the second order cumulant corresponds to variance of values that the amplitude may take. For example, the value of the second order cumulant is largely different between a signal such as the OFDM signal for which peak-to-average power ratio (PAPR) is very high and a constant envelope signal such as a single carrier signal or noise. Variance is large in the former signal since it takes various amplitude values, and variance of the latter signal is relatively small. By using such characteristics, it becomes possible to detect whether the OFDM signal is included in the received signal.

As statistical value usable as the waveform feature amount other than the cyclostationarity and second order cumulant, frequency correlation characteristics can be used in the same way (non-patent document 3). In the case of using the frequency correlation characteristics, deviation of signal power is added to subcarrier frequency components of the multicarrier signal such as OFDM, and the radio station having the control apparatus of the present invention calculates frequency correlation value of the received signal, so that the radio station can detect the peak value, the number of peaks, frequency intervals between the peaks and the like, as the waveform feature amount.

As mentioned above, the waveform feature amount representing the feature of the signal waveform may be based on the correlation value of the signal, or may be based on the statistical value of the signal. However, for the sake of convenience of explanation, in the following examples, it is assumed that the waveform feature amount calculation unit 31 of FIG. 3 calculates the waveform feature amount represented by second order cyclic autocorrelation function (CAF).

In the following, equations to be used for explanation of the present embodiment are shown.

The second order cyclic autocorrelation function (CAF) for a signal x(t) is represented by the following equation.

$$R_x^\alpha(\tau) = \lim_{I \to \infty} \frac{1}{I} \int_0^I x(t) x^*(t+\tau) e^{-j2\pi\alpha t} \, dt \quad (1)$$

In the equation, "*" represents complex conjugate, and "I" represents observation time length. "α" indicates cyclic frequency, and "τ" represents lag parameter.

Regarding CAF, in general, if $\alpha \neq 0$ and $R_x^\alpha(\tau) \neq 0$, x(t) has cyclostationarity.

A discrete time representation of the equation (1) is as follows.

$$R_x^\alpha(v) = \frac{1}{I_0} \sum_{i=0}^{I_0-1} x[i] x^*(i+v) e^{-j2\pi\alpha i T_s} \quad (2)$$

In the equation, "$I_0$" represents the number of observed samples, and "v" represents discrete time representation of the lag parameter. In addition, $x[i] \equiv x(iTs)$ holds true in which Ts represents a sampling period.

Regarding CAF of equation (2), the following equation holds true among the estimated value $\tilde{R}_x^\alpha(v)$, the true value $R_x^\alpha(v)$, and an estimation error $\Delta_x^\alpha(v)$.

$$\tilde{R}_x^\alpha(v) = R_x^\alpha(v) + \Delta_x^\alpha(v) \qquad (3)$$

When the number of observed samples is sufficiently large, the estimation error $\Delta_x^\alpha(v)$ becomes 0.

The peak of CAF occurs when $v=0$ for a cyclic frequency $\alpha$. Therefore, assuming that a cyclic frequency of a signal which may be included in the received signal $x(t)$ is $\alpha_0$, a $1 \times 2$ type vector (candidate vector) having CAF estimation values ($v=0$) in the cyclic frequency $\alpha_0$ as vector components is defined as follows.

$$\tilde{r}_{\tilde{x}}^{\alpha 0} = r_x^{\alpha 0} + \Delta_x^{\alpha 0} \qquad (4)$$

$$\tilde{r}_{\tilde{x}}^{\alpha 0} = [Re\{\tilde{R}_{\tilde{x}}^{\alpha 0}(0)\}, Im\{\tilde{R}_{\tilde{x}}^{\alpha 0}(0)\}] \qquad (5)$$

$$r_x^{\alpha 0} = [Re\{R_x^{\alpha 0}(0)\}, Im\{R_x^{\alpha 0}(0)\}] \qquad (6)$$

$$\Delta_x^{\alpha 0} = [Re\{\Delta_x^{\alpha 0}(0)\}, Im\{\Delta_x^{\alpha 0}(0)\}] \qquad (7)$$

In the equations, $Re\{\}$ and $Im\{\}$ represent a real part and an imaginary part of the argument respectively.

<1.2.2 Test Statistic Calculation Unit>

The test statistic calculation unit 32 of FIG. 3 calculates test statistics by using a value of the waveform feature amount obtained in the waveform feature amount calculation unit 31. The test statistic is an amount for determining whether a detection target signal is included in the received signal. Therefore, the test statistic can be represented by various amounts. For example, as the test statistic, a value of the waveform feature amount in a specific parameter (especially, cyclic frequency) may be used. Or, as described later, a value derived by using a covariance including contribution of various waveform feature amounts and a specific waveform feature amount may be used as the test statistic. In the present embodiment, as an example, the following test statistic $Z_x^{\alpha 0}$ is used.

$$Z_x^{\alpha 0} = I_0 \tilde{r}_{\tilde{x}}^{\alpha 0} (\tilde{\Sigma}_x^{\alpha 0})^{-1} (\tilde{r}_{\tilde{x}}^{\alpha 0})' \qquad (8)$$

In the equation, "$\sim r_x^{\alpha 0}$" represents the candidate vector, and "( )'" indicates transposition. "$\sim \Sigma_x^{\alpha 0}$" represents an estimation value of a covariance matrix of the candidate vector, and is calculated by the following equations.

$$\sum_x^{\alpha 0} = \begin{bmatrix} Re\left\{\frac{Q+Q^{(*)}}{2}\right\} & Im\left\{\frac{Q-Q^{(*)}}{2}\right\} \\ Im\left\{\frac{Q+Q^{(*)}}{2}\right\} & Re\left\{\frac{Q^{(*)}-Q}{2}\right\} \end{bmatrix} \qquad (9)$$

$$Q = S_{f0,0}^{2\alpha 0}(\alpha_0) \qquad (10)$$

$$Q^{(*)} = S_{f0,0}^{0,(*)}(-\alpha_0) \qquad (11)$$

$$\lim_{I_0 \to \infty} I_0 cum(\tilde{R}_x^\alpha(v), \tilde{R}_x^\beta(\rho)) = S_{f_{v,\rho}}^{\alpha+\beta}(\beta) \qquad (12)$$

$$\lim_{I_0 \to \infty} I_0 cum(\tilde{R}_x^\alpha(v), (\tilde{R}_x^\beta(\rho))^*) = S_{f_{v,\rho}}^{\alpha-\beta,(*)}(-\beta) \qquad (13)$$

-continued $$S_{f_{v,\rho}}^\alpha(\omega) = \lim_{I_0 \to \infty} \frac{1}{I_0} \sum_{i=0}^{I_0-1} \sum_{\xi=-\infty}^{\infty} cum(f_v[i], f_\rho[i+\xi]) \cdot e^{-j2\pi\omega\xi} e^{-j2\pi\alpha iTs} \qquad (14)$$

$$S_{f_{v,\rho}}^{\alpha,(*)}(\omega) = \lim_{I_0 \to \infty} \frac{1}{I_0} \sum_{i=0}^{I_0-1} \sum_{\xi=-\infty}^{\infty} cum(f_v[i], f_\rho^*[i+\xi]) \cdot e^{-j2\pi\omega\xi} e^{-j2\pi\alpha iTs} \qquad (15)$$

$$\tilde{Q} = \tilde{S}_{f_0,0}^{2\alpha_0}(\alpha_0) \qquad (16)$$

$$= \frac{1}{I_0 L} \sum_{s=-(L-1)/2}^{(L-1)/2} W(s) \times F_{I_0,0}\left(\alpha_0 - \frac{2\pi s}{I_0}\right) F_{I_0,0}\left(\alpha_0 + \frac{2\pi s}{I_0}\right)$$

$$\tilde{Q}(*) = \tilde{S}_{f_0,0}^{0,(*)}(-\alpha_0) \qquad (17)$$

$$= \frac{1}{I_0 L} \sum_{s=-(L-1)/2}^{(L-1)/2} W(s) \times F_{I_0,0}^*\left(\alpha_0 + \frac{2\pi s}{I_0}\right) F_{I_0,0}\left(\alpha_0 + \frac{2\pi s}{I_0}\right)$$

$$F_{T,\tau}(\omega) = \sum_{t=0}^{T-1} x(t)x(t+\tau)e^{j\omega t}$$

In the equations, "cum( )" represents cumulant, and $f_v[i] \equiv x[i]x[i+v]$ holds true. "W(s)" indicates a normalized spectrum window, and it is assumed that L is an odd number.

<1.2.3 Signal Decision Unit>

The signal decision unit 33 compares the value $Z_x^{\alpha 0}$ of the test statistic obtained by the test statistic calculation unit 32 with a predetermined threshold value Γ so as to determine whether the detection target signal (a signal in which the cyclic frequency is $\alpha_0$) is included in the signal input to the antenna. The determination may be performed using a statistical test method such as "likelihood ratio test", "Generalized likelihood ratio test (GLRT)" and the like. These test methods use a property that distribution of test statistics converges on chi-square distribution when the observed signal does not have cyclostationarity in a cyclic frequency. When the distribution of the test statistics does not converge on chi-square distribution, that is, when the distribution of the test statistics converges on normal distribution, it is considered that the observed signal has cyclostationarity in a cyclic frequency. Therefore, it can be determined that the detection target signal is included in the signal input to the antenna when the test statistic $Z_x^{\alpha 0}$ exceeds the threshold value P. The threshold value can be determined arbitrarily based on significance level. The significance level or the false alarm rate is set to be a probability by which the detection target signal is erroneously determined to be included in the received signal when the detection target signal is not actually included in the received signal. For example, when the significance level is 5%, 5% is the upper limit of probability in which the detection target signal is erroneously recognized to be included in the received signal even though the detection target signal is not actually included in the received signal.

It can be considered that, when there are two types of detection target signals, they are detected by the method similar to the above-mentioned method. For example, it is assumed that there is a possibility that the received signal includes a signal in which the cyclic frequency is $\alpha_0$ and a signal in which the cyclic frequency is $\alpha_1$. In this case, for example, presence or absence of the signal of cyclic frequency $\alpha_0$ is determined based on whether test statistic $Z_x^{\alpha 0}$ on the signal of cyclic frequency $\alpha_0$ exceeds the threshold value Γ. In the same way, for example, presence or absence of the signal of cyclic frequency $\alpha_1$ is determined based on whether test statistic $Z_x^{\alpha 1}$ on the signal of cyclic frequency $\alpha_1$ exceeds the threshold value Γ. In the case when the two types of detection target signals have similar strength, each of the signals can be detected by the above-mentioned method. The reason is that, in any of the signals, the test statistic can be large so as to exceed the threshold value. However, when the two types of signals included in the signal input to the antenna have been received with different powers respectively, it becomes hard to detect the weaker signal. The reason is that, when the received signal does not include the detection target signal or includes the detection target signal only with a negligible small level, it becomes hard that the value of the test statistic for the signal exceeds the threshold value. For addressing this problem, a iterative detection control unit 34 is provided in the present embodiment.

<1.2.4 Iterative Detection Control Unit>

The iterative detection control unit 34 feeds the determination result of the signal decision unit 33 back to the test statistic calculation unit 32 so that test statistic for the undetected signal is re-calculated. The signal decision unit 33 tries to detect the undetected signal based on the re-calculated test statistic. More particularly, effect of the strong signal which has been already detected is removed from calculation of test statistic of the undetected weak signal, so as to detect presence or absence of the undetected signal accurately. By iterating such processing, a specific signal in the received signal can be detected irrespective of received power. In the following, the operation principle is described in detail.

For the sake of simplifying the explanation, it is assumed that the received signal x(t) input to the antenna includes the detection target signals $s_0(t)$ and $s_1(t)$ as shown in the following equation and that the signal $s_0$ is a weak signal and the signal $s_1$ is a strong signal.

$$x(t)=s_0(t)+s_1(t)$$

In the equation, the signal $s_0$ is a signal having cyclic autocorrelation of a cyclic frequency $\alpha_0$, and the signal $s_1$ is a signal having cyclic autocorrelation of a cyclic frequency $\alpha_1$. The following relationship holds true between $\alpha_0$ and $\alpha_1$.

$$\alpha_1=\alpha_0+\Delta_\alpha$$

When the number $I_0$ of the observed samples is very large ($I_0 \to \infty$), the CAF value $R_x^{\alpha 0}(0)$ (0) of the received signal x(t) when $\alpha=\alpha_0$ becomes equal to $R_{s0}^{\alpha 0}(0)$. The reason is that $R_{s1}^{\alpha 0}(0)$ gets closer to 0. However, since observation time is finite, $R_x^{\alpha 0}(0) \neq R_{s0}^{\alpha 0}(0)$.

By the way, CAF peak of the strong signal $s_1$ having cyclostationarity of $\alpha=\alpha_1$ exerts effects on calculation of test statistic of the weak signal $s_0$ (more particularly, calculation of the estimation value $\sim\Sigma_x^{\alpha 0}$ of covariance matrix). For example, according to the equations (16) and (17), it is necessary to calculate the function of $F_{I_0,0}(\bullet)$ in order to calculate test statistic $Z_x^{\alpha 0}=I_0(\sim r_x^{\alpha 0})(\sim\Sigma_x^{\alpha 0})^{-1}(\sim r_x^{\alpha 0})'$ of the weak signal $s_0$ having cyclostationarity of $\alpha=\alpha_0$. As the argument of the function $F_{I_0,0}$, various values may be used in addition to $\alpha_0$, and there may be a case where the argument is $\alpha_0+\Delta_\alpha=\alpha_1$. Therefore, the test statistic $Z_x^{\alpha 0}$ of the weak signal $s_0$ becomes a weak value due to contribution of the strong signal $s_1$, so that detection of the weak signal $s_0$ becomes difficult (it is needless to say that detection of the strong signal $s_1$ is easy).

As mentioned above, the CAF value $R_{s1}^{\alpha}(0)$ of the strong signal $s_1$ comes closer to 0 if $\alpha \neq \alpha_1$ and the number $I_0$ of observed samples is sufficiently large ($I_0 \to \infty$). Therefore, when the number $I_0$ of observed samples is sufficiently large, $F_{I_0,0}(\alpha)$ can be expressed as follows.

$$F_{I_0,0}(\alpha) \simeq \begin{cases} R_{s1}^{\alpha 1}(0) & (\alpha=\alpha_1) \\ R_{s2}^{\alpha 2}(0) & (\alpha=\alpha_2) \\ 0 & (\alpha \neq \alpha_1, \alpha_2) \end{cases} \quad (18)$$

In the present embodiment, after the strong signal $s_1$ is detected at the first time of the iterative calculation, test statistic $Z_x^{\alpha 0}=I_0(\sim r_x^{\alpha 0})(\sim\Sigma_x^{\alpha 0})^{-1}(\sim r_x^{\alpha 0})'$ of the weak signal $s_0$ is recalculated while removing the effect of the strong signal $s_1$. More particularly, when calculating the amount shown in the equation (18), contribution $F_{I_0,0}(\alpha_1) \approx R_{s1}^{\alpha 1}(0)$ of the strong signal $s_1$ that has been detected is set to be 0 forcibly. The test statistic $Z_{s0}^{\alpha 0}$ of the weak signal $s_0$ derived in the above-mentioned way does not include the contribution of the strong signal $s_1$. Therefore, when the received signal x(t) includes the signal $s_0$, it takes a large value. Thus, even though the received power of the signal $s_0$ is weak, presence of the signal $s_0$ can be detected. As mentioned above, the iterative detection control unit 34 sends a control signal to the test statistic calculation unit 32 so that the effect of the already detected strong signal is removed in re-calculation of the test statistic of the undetected weak signal.

<1.3 Operation>

Figure 5:
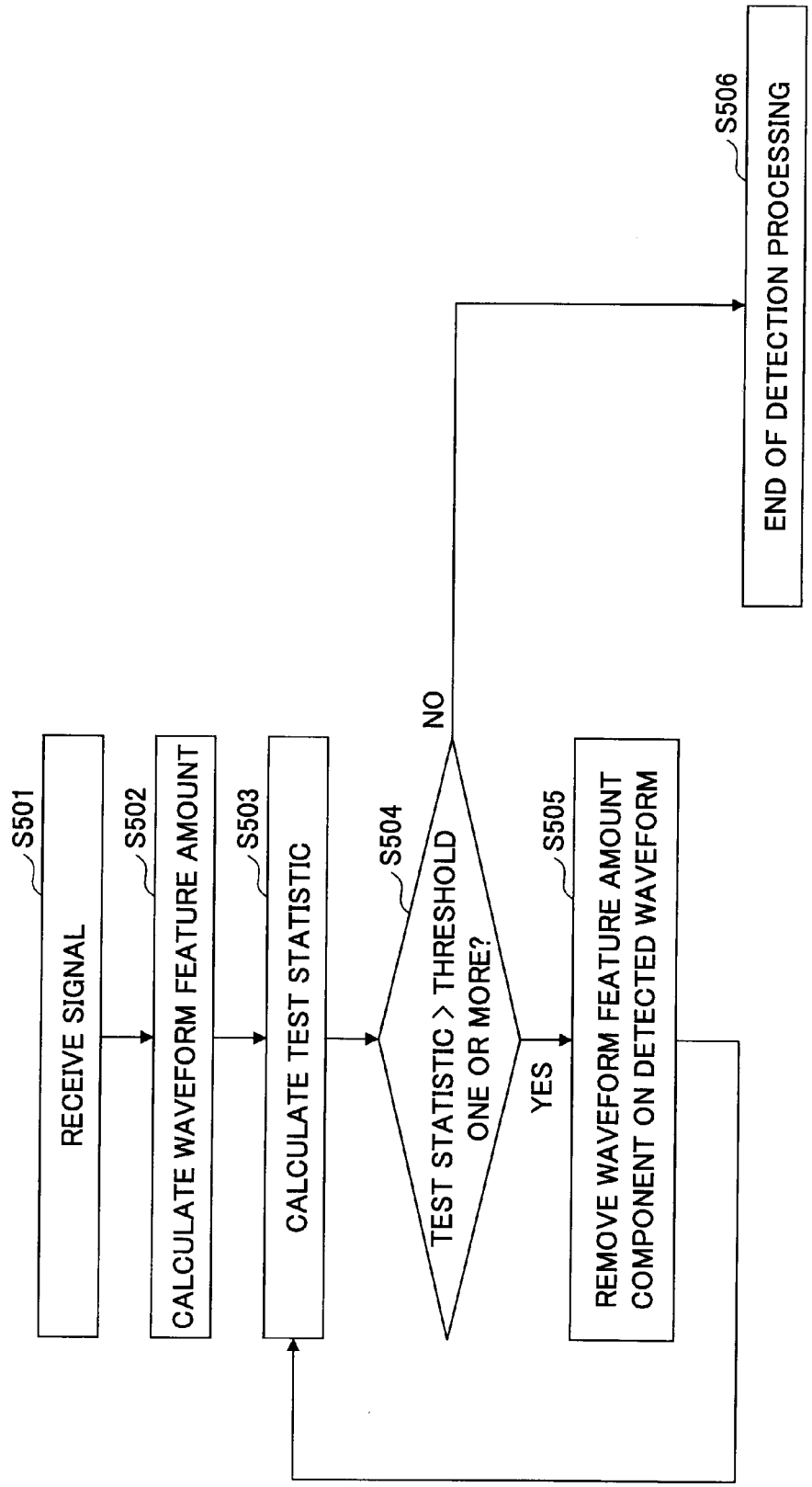
FIG. 5 is a flowchart showing operation of the signal detection apparatus of the first embodiment of the present invention.

FIG. 5 is a flowchart showing operation of the signal detection apparatus. In step S501, the signal x(t) is received via the antenna of the radio station. The received signal x(t) includes detection target signals of the radio station. For example, it is assumed that M types of signals S1, S2, ..., SM are detection target signals. For the sake of convenience of explanation, M=3.

In step S502, the waveform feature amount calculation unit 31 calculates a waveform feature amount of the received signal. In the present embodiment, the detection target signals have features of second order cyclic autocorrelation function (CAF). The signal s1 has periodicity of cyclic frequency $\alpha_1$, the signal s2 has periodicity of cyclic frequency $\alpha_2$, and the signal s3 has periodicity of cyclic frequency $\alpha_3$.

In step S503, the test statistic calculation unit 32 calculates test statistic for a parameter (more particularly, cyclic frequency) of each of detection target signals. The test statistic $Z^{\alpha 1}_n$ is calculated for the signal s1, the test statistic $Z^{\alpha 2}_n$ is calculated for the signal s2, and the test statistic $Z^{\alpha 3}_n$ is calculated for the signal s3, in which n indicates the number of times of iteration. The test statistic may be an amount of $Z^{\alpha}_n=I_0(\sim r_x^{\alpha})(\sim\Sigma_x^{\alpha})^{-1}(\sim r_x^{\alpha})'$, for example, or may be represented by other amount.

In step S504, the signal decision unit 33 compares the test statistic with a threshold so as to determine whether a detection target signal is included in the received signal. In the before-mentioned concrete example, test statistics $Z^{\alpha 1}_n$, $Z^{\alpha 2}_n$, and $Z^{\alpha 3}_n$ are compared with the threshold $\Gamma$ respectively. Then, when a test statistic exceeds the threshold, it is determined that a signal related to the test statistic is included. The value of the threshold $\Gamma$ is determined based on significance level of the test as mentioned before. By determining a permissible probability (false alarm rate) by which a detection target signal is erroneously determined to be included in a signal input to the antenna even though the detection target signal is not actually included, a value of test statistic corresponding to the probability may be adopted as the threshold $\Gamma$. When there is no test statistic exceeding the threshold, the flow goes to step S506, and the flow ends. When there is a test statistic exceeding the threshold, the flow goes to step S505.

As an example, it is assumed that, at the first time (n=1) in the iteration calculation, the test statistic $Z^{\alpha 1}{}_n$ of the signal s1 exceeds the threshold $\Gamma$ but other test statistics are smaller than the threshold, as follows.

$$Z^{\alpha 1}{}_{n=1} \geq \Gamma$$

$$Z^{\alpha 2}{}_{n=1} < \Gamma$$

$$Z^{\alpha 3}{}_{n=1} < \Gamma$$

In the conventional method, only the signal s1 can be detected. Even though signals s2 and s3 exist, they cannot be detected since the test statistic is less than the threshold. In contrast, in the present embodiment, the flow goes to step S505 so as to detect weak signals.

In step S505, the iterative detection control unit 34 sends a control signal to the test statistic calculation unit 32. The control signal indicates the already detected signal, so as to remove effects of the already detected signal when the test statistic calculation unit 32 re-calculates the test statistic for each of the detection target signals. In this example, the iterative detection control unit 34 reports to the test statistic calculation unit 32 that the signal s1 has been detected. Then, the flow returns to step S502. In step S502, the test statistic calculation unit 32 re-calculates test statistics. In this example, test statistics $Z^{\alpha 2}{}_{n=2}$ and $Z^{\alpha 3}{}_{n=2}$ are re-calculated for the undetected signals s2 and s3 respectively. It is unnecessary to calculate test statistic $Z^{\alpha 1}{}_{n=2}$ for the detected signal s1. The re-calculated test statistics $Z^{\alpha 2}{}_{n=2}$ and $Z^{\alpha 3}{}_{n=2}$ do not include contribution of the already detected signal s1. For example, this calculation is performed by setting the contribution of the cyclic frequency $\alpha_1$ to be 0 when calculating covariance matrix elements. For example, in the equations (16) and (17), $F_{f0,0}(\alpha_1)$ is forced to 0. Thus, $F_{f0,0}(\alpha)$ becomes $R_{s2}{}^{\alpha 2}(0)$ when $\alpha = \alpha_2$, and $F_{f0,0}(\alpha)$ becomes $R_{s3}{}^{\alpha 3}(0)$ when $\alpha = \alpha_3$. For other values of $\alpha$, $F_{f0,0}(\alpha)$ becomes 0. This point is different from approximation of the equation (18). The reason is that $F_{f0,0}(\alpha)$ becomes $R_{s1}{}^{\alpha 1}(0)$ when $\alpha = \alpha_1$ according to the approximation of the equation (18). Since the test statistics $Z^{\alpha 2}{}_{n=2}$ and $Z^{\alpha 3}{}_{n=2}$ re-calculated in the above-mentioned way do not include the contribution of the detected signal, presence or absence of the undetected signals can be determined accurately. At the first time of the iterative calculation, the result is $Z^{\alpha 2}{}_{n=1} < \Gamma$. But, at the second time, possibility of $Z^{\alpha 2}{}_{n=2} \geq \Gamma$ increases. In the same way, at the first time of the iterative calculation, the result is $Z^{\alpha 3}{}_{n=1} < \Gamma$. At the second time, possibility of $Z^{\alpha 3}{}_{n=2} \geq \Gamma$ increases.

In step S504, the signal decision unit 33 compares the re-calculated test statistics $Z^{\alpha 2}{}_{n=2}$ and $Z^{\alpha 3}{}_{n=2}$ with the threshold $\Gamma$ respectively. When a test statistic exceeds the threshold, it is determined that a signal related to the test statistic is included. After that, until no test statistic exceeding the threshold remains, processing of calculation S503 of test statistic, determination S504 of signal presence, and removal S505 of detected signal is iterated.

Accordingly, in the first embodiment, even when the same frequency band is shared among different radio communication systems, the radio station detects presence of signals used around the radio station accurately, to perform transmission only when interference does not occur. Accordingly, efficient spectrum sharing can be realized. Especially, when there are a plurality of detection target signals, by iterating signal detection processing while removing effects of the once-detected signals, presence of signals having small signal power can be easily detected. Accordingly, the radio station can perform communication properly while reducing interference to other communications.

2. Second Embodiment

<2.1 Radio Station and Signal Detection Apparatus>

Figure 6:
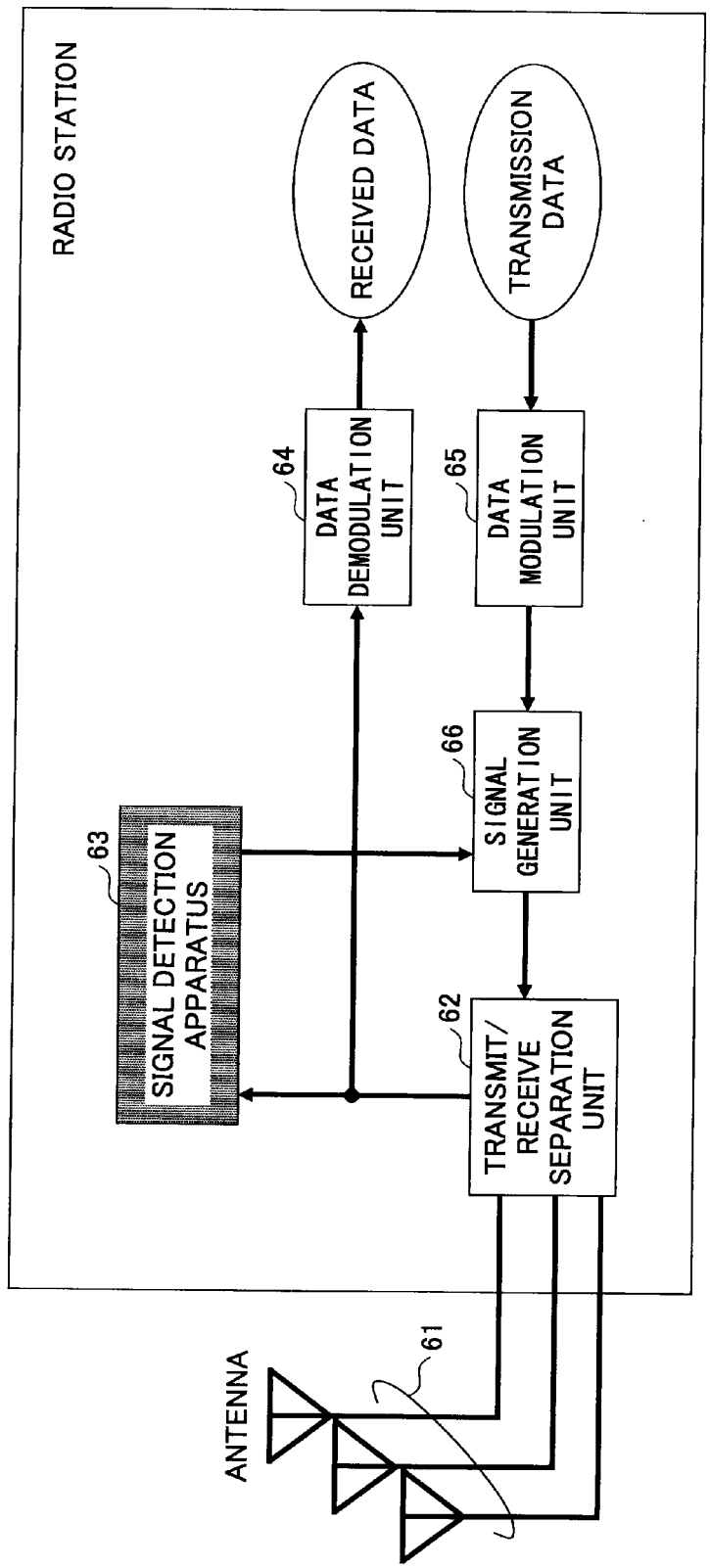
FIG. 6 is a block diagram of the radio station of a second embodiment of the present invention.

FIG. 6 is a block diagram of the radio station 11 of a second embodiment of the present invention. The radio station includes a plurality of antennas 61, a transmit/receive separation unit 62, a signal detection apparatus 63, a data demodulation unit 64, a data modulation unit 65 and a signal generation unit 66. Each of signals input to the antennas 61 of the radio station is input to the signal detection apparatus 63 via the transmit/receive separation unit 62. The transmit/receive separation unit 62 may include a signal combining function for combining signals from the antennas, and a signal distribution function for distributing signals generated by the signal generation unit 66 to a plurality of antennas. Or, the signal combining and signal distribution may be performed by the signal generation unit 66 and the data demodulation unit 64 respectively separately from the transmit/receive separation unit 62. In addition, as shown in the non-patent document 4, the transmit/receive separation unit 62 includes a weight control function for weighting transmission signal and received signal of each antenna in order to receive signals from a specific direction or to transmit signals to a specific direction using a plurality of antennas.

The signal detection apparatus 63 detects whether a signal that should be considered is included in the received signal, determines whether to transmit a signal based on the detection result. When a signal can be transmitted, the signal detection apparatus 63 determines parameters (such as data modulation scheme, frequency resource block, transmission power and the like) to be used for transmitting a signal.

Figure 7:
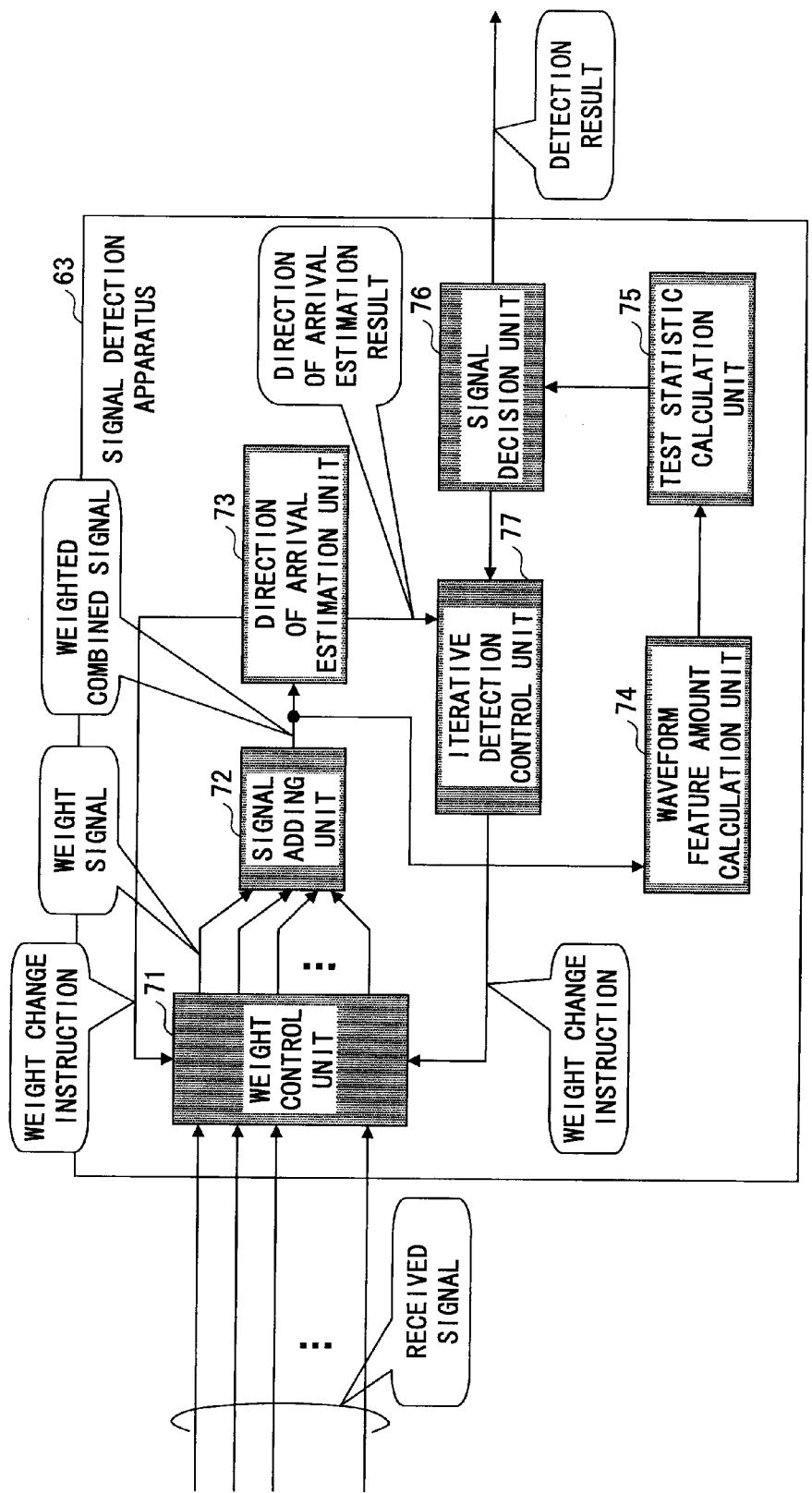
FIG. 7 is a block diagram of the signal detection apparatus of the second embodiment of the present invention.

FIG. 7 shows details of the signal detection apparatus of the radio station shown in FIG. 6. The signal detection apparatus includes a weight control unit 71, a signal adding unit 72, a direction-of-arrival estimation unit 73, a waveform feature amount calculation unit 74, a test statistic calculation unit 75, a signal decision unit 76, and an iterative detection control unit 77.

The weight control unit 71 assigns weights to each of signals input from the antennas 61. The signal adding unit 72 combines the weighted signals. By combining the signals after weighting, it becomes possible to suppress reception strength of a signal from a direction (to generate null), and, on the other hand, to enhance reception strength of a signal from a direction (to generate a beam). The former method is called a null steering method, and the latter method is called a beam forming method. The weight control is described in the non-patent document 4, for example. The present invention is not limited to a specific method, and any appropriate directivity control method that can be used in the present technical field can be used.

The direction-of-arrival estimation unit 73 estimates a direction from which a signal arrives based on weights used in the weight control unit 71 and a combined signal corresponding to the weights. More particularly, it is possible to estimate the direction of arrival of signals according to the number of antennas of the radio station by using a beam former method, a Capon method, a maximum entropy method, a minimum norm method, a MUSIC method, an ESPRIT method and the like. The direction-of-arrival estimation method is described in the non-patent document 4, for example.

The waveform feature calculation unit 74 calculates a waveform feature amount for the weighted-combined signal combined by the signal adding unit 72. As the waveform feature amount, similarly to the first embodiment, cyclostationarity obtained by a second order cyclic autocorrelation value, a variance value of signal amplitude, a frequency correlation value and the like may be utilized.

The test statistic calculation unit 75 calculates the test statistic by using a value of the waveform feature amount obtained in the waveform feature amount calculation unit 74. The test statistic is used for determining whether a detection target signal is included in the signal input into the antennas. As the test statistic, like the first embodiment, a value of the waveform feature amount in a specific parameter may be used, and a value calculated by using a covariance matrix including contribution of various parameters and a value of the waveform feature amount in a specific parameter may be used.

The signal decision unit 76 compares the value of the test statistic obtained by the test statistic calculation unit 75 with a predetermined threshold value so as to determine presence or absence of the detection target signal.

The iterative detection control unit 77 sends a control signal to the weight control unit 71 based on the determination result of the signal decision unit 76. The control signal indicates that null should be generated for one of arrival directions in order that an already detected signal may be hardly included in the received signal. By realizing a beam having null in a specific arrival direction, the received signal that is received after that does not include a signal from the direction. As a result, when calculating test statistic of the other undetected signals, effects of the signal arriving from the direction can be removed.

The iterative detection control unit 77 may instruct the weight control unit 71 to generate null for a plurality of arrival directions at the same time. Or, the iterative detection control unit 77 may instruct the weight control unit 71 to form a beam for one of the arrival directions instead of generating null. Operation for concrete detection processing and the like is described later.

<2.2 Operation>

Figure 8:
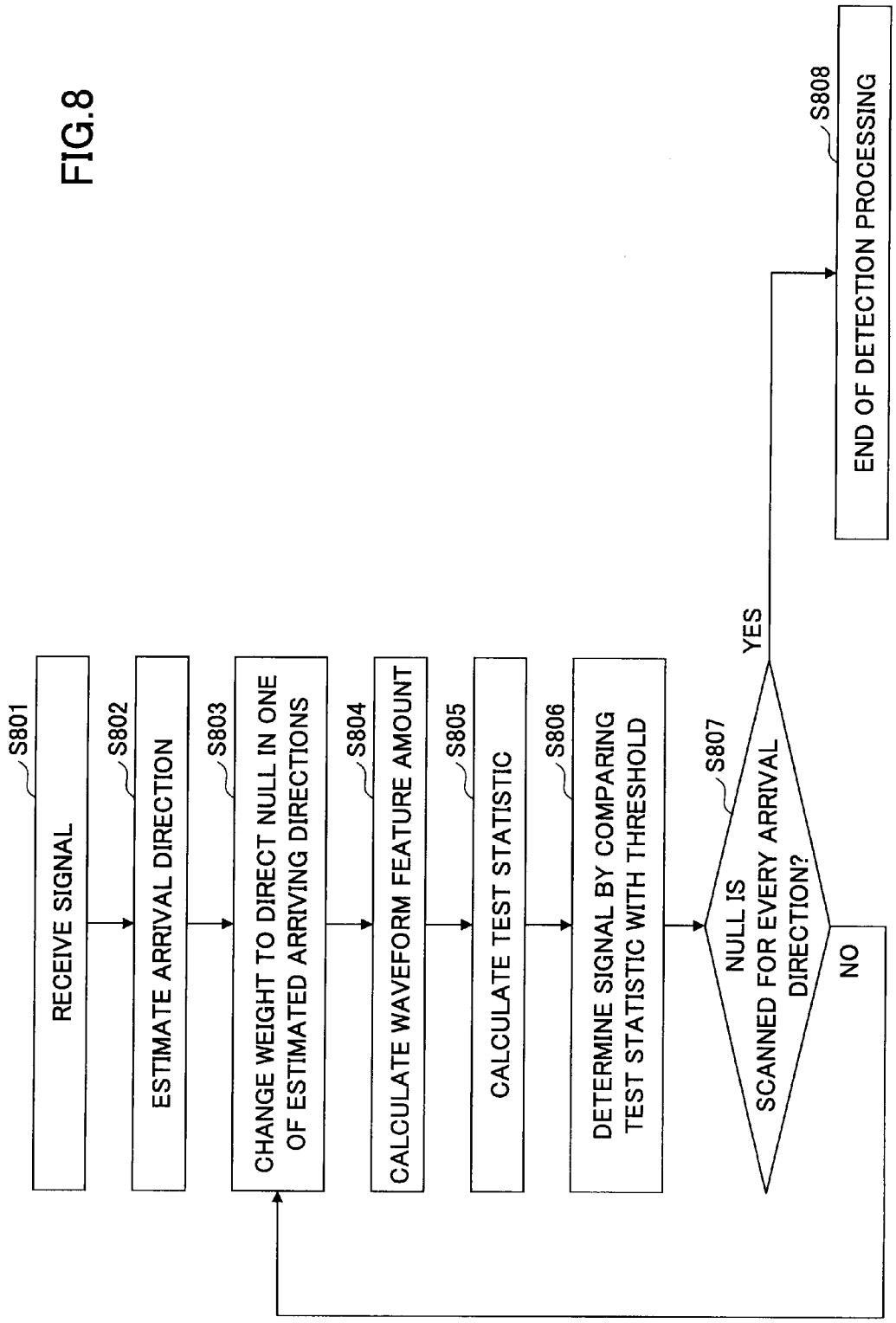
FIG. 8 is a flowchart showing operation of the signal detection apparatus of the second embodiment of the present invention.

FIG. 8 is a flowchart showing operation of the signal detection apparatus 63 of the second embodiment. In step S801, signals received from the plurality of antennas 61 are input to the signal detection apparatus 63.

In step S802, arrival directions of the received signals are estimated by the direction-of-arrival estimation unit 802 and the weight control unit 71. As an example, it is assumed that two directions of angles $\theta 1$ an $\theta 2$ are obtained as the estimation result of arrival directions.

In step S803, weights of the weight control unit 71 are changed based on the estimation result of the direction-of-arrival estimation unit 73. The weights used in this processing are weights for generating null for one of arrival directions estimated by the direction-of-arrival estimation unit 73. For example, a beam having null in the direction of $\theta 1$ is realized. Accordingly, signals received after that does not include a signal arriving from the direction of $\theta 1$, but includes a signal arriving from the direction of $\theta 2$.

In step S804, the waveform feature amount calculation unit 74 calculates the waveform feature amount of the weighted-combined signal. In the present embodiment, two types of signals s1 and s2 are detection targets, and they have characteristics based on second order cyclic autocorrelation function (CAF). The signal s1 has periodicity of cyclic frequency $\alpha_1$, the signal s2 has periodicity of cyclic frequency $\alpha_2$.

In step S805, in the same way as the first embodiment, the test statistic calculation unit 75 calculates test statistic for a parameter of the detection target signal. The test statistic $Z^{\alpha 1}$ is calculated for the signal s1, the test statistic $Z^{\alpha 2}$ is calculated for the signal s2. The test statistic may be an amount of $I_0(\sim r_x^{\alpha})(\sim \Sigma_x^{\alpha})^{-1}(\sim r_x^{\alpha})'$, for example, or may be represented by other amounts.

In step S806, the signal decision unit 76 compares the test statistic with a threshold so as to determine whether a detection target signal is included in the received signal. In the before-mentioned concrete example, test statistics $Z^{\alpha 1}$ and $Z^{\alpha 2}$ are compared with the threshold $\Gamma$ respectively so as to determined whether the detection target signal is included in the received signal. Similarly to the first embodiment, when the test statistic exceeds the threshold, it is determined that a signal related to the test statistic is included.

In step S807, the iterative detection control unit 77 determines, for each of arrival directions estimated by the direction-of-arrival estimation unit 73, whether there remains a direction for which null has not yet been generated. In the present example, since weights for generating null in the direction of $\theta 2$ have not yet been generated, the flow returns to step S803 so as to realize a beam having null in the direction of $\theta 2$, and the described processing is iterated.

On the other hand, after generation of null completes for every arrival direction estimated by the direction-of-arrival estimation unit, signals detected so far can be determined to be included in the received signals, and the flow ends the detection processing (S808). In the above-mentioned example, when generation of null and signal detection end for all directions of $\theta 1$ and $\theta 2$, the flow ends.

In the present embodiment, when there are a plurality of signal arrival directions, signal detection is performed by directing null in one direction, and after that, processing for performing signal detection by directing null in other directions is repeated. The signal of the direction to which null is directed is removed when calculating test statistic. Therefore, signal detection is performed by limiting test statistics to directions in which null is not directed. Accordingly, it becomes possible to detect not only a strong signal but also a weak signal in the case when signals of different strength come from different directions.

In the second embodiment, in the case when a same frequency band is shared among different radio communication systems and a plurality of signals are used around the radio station, arrival directions of signals are estimated, and detection processing is performed while removing each of the directions. Accordingly, without receiving effect of a signal arriving from the direction of null, detection of signals arriving from other directions can be performed accurately.

Although the direction from which a signal arrives can be estimated only by the direction-of-arrival estimation, it cannot be determined what signal is arriving. According to the second embodiment, by using both of the waveform feature amount and the direction-of-arrival estimation related to the signal, it becomes possible to detect what signal arrives from what direction.

In both of the first and the second embodiments, after presence of a specific signal is detected, test statistic of an undetected signal is re-calculated under a condition in which effect of the specific signal is removed, so as to re-determine presence or absence of the undetected signal. In the first embodiment, the effect of the specific signal is removed by neglecting contribution of the specific signal when calculating test statistic. On the other hand, in the second embodiment, by directing null to a specific direction, effect of a signal arriving from the direction is removed spatially (physically). Each of the methods of the first and the second embodiments may be used separately, or the first and the second embodiments may be used by combining them as explained in the following modified example.

3. Third Embodiment

<3.1 Signal Detection Apparatus>

Figure 9:
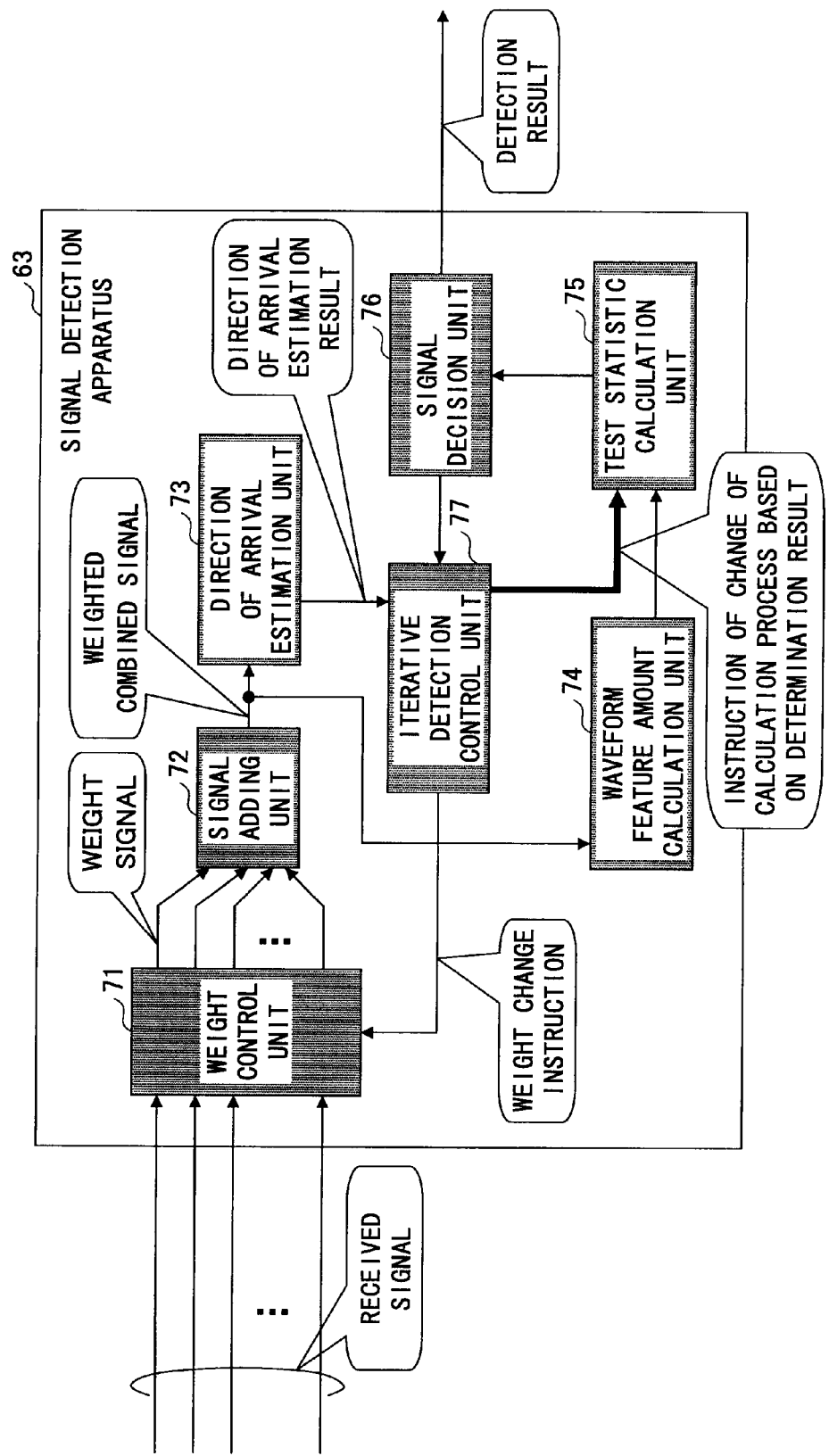
FIG. 9 is a block diagram of the signal detection apparatus of a third embodiment of the present invention.

FIG. 9 shows the signal detection apparatus of the modified example. The signal detection apparatus shown in FIG. 9 is different from the signal detection apparatus shown in FIG. 7 in that the iterative detection control unit 77 sends a control signal to the test statistic calculation unit 75. In the same way as the first embodiment, the iterative detection control unit 77 instructs the test statistic calculation unit 75 to change calculation process based on the determination result of the signal decision unit 76. That is, the present modified example corresponds to one in which operation of the iterative control unit of the first embodiment is combined to the second embodiment.

<3.2 Operation>

Figure 10:
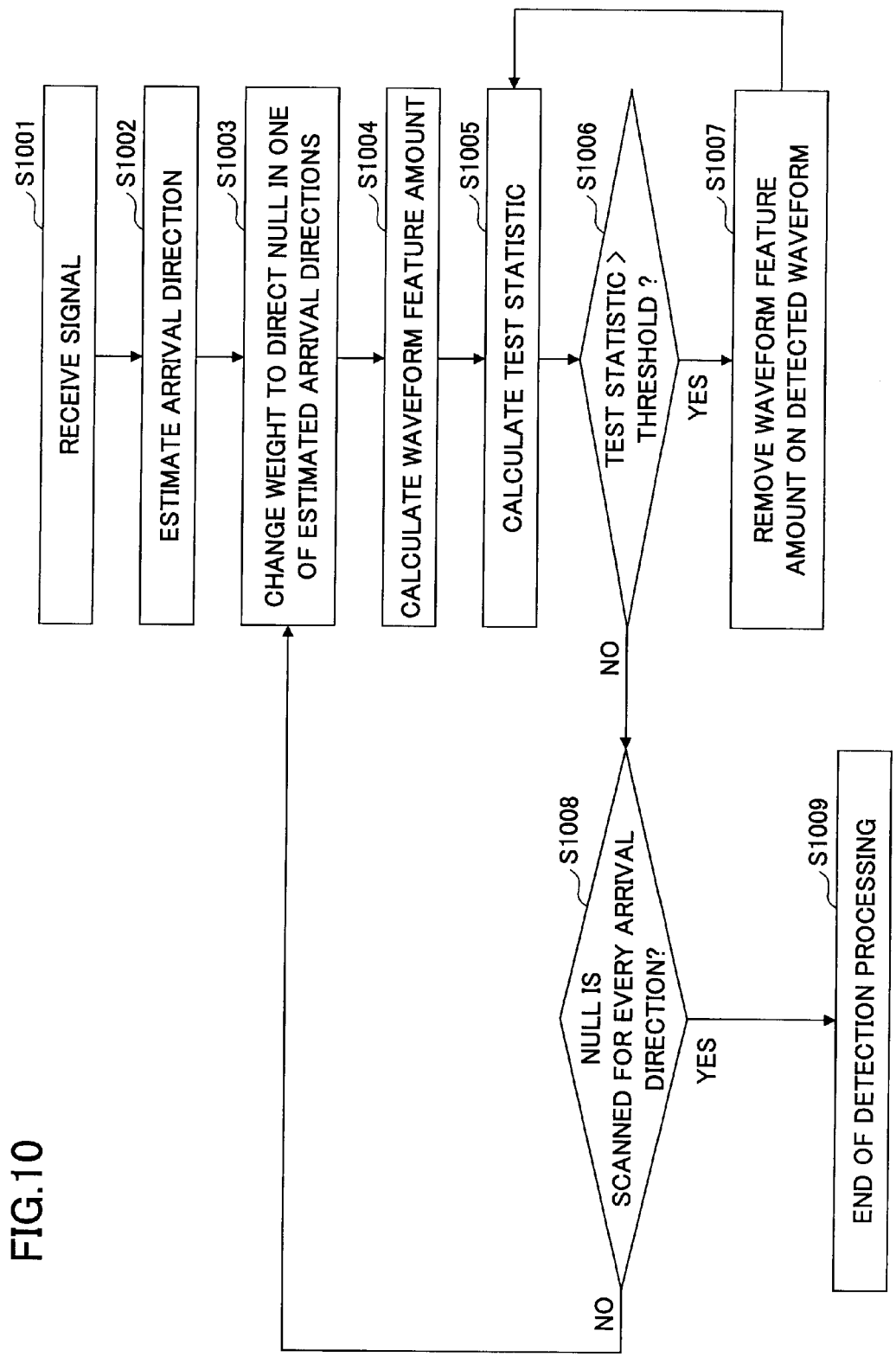
FIG. 10 is a flowchart showing operation of the signal detection apparatus of the third embodiment of the present invention.

FIG. 10 is a flowchart showing operation of the signal detection apparatus of the modified example. In step S1001, signals received from the plurality of antennas 61 are input to the signal detection apparatus 63.

In step S1002, arrival directions of the received signals are estimated by the direction-of-arrival estimation unit and the weight control unit. As an example, it is assumed that three directions of angles θ1, θ2 and θ3 are obtained as the estimation result of arrival directions.

In step S1003, weights of the weight control unit 71 are changed based on the estimation result of the direction-of-arrival estimation unit 73. The weights used in this processing are weights for generating null for one of arrival directions estimated by the direction-of-arrival estimation unit 73 in the same way as the second embodiment. For example, a beam having null in the direction of θ1 is realized. Accordingly, signals received after that include signals arriving from the directions of θ2 and θ3.

In step S1004, the waveform feature amount calculation unit 74 calculates waveform feature amount of the weighted-combined signal. In the present embodiment, it is assumed that three types of signals s1, s2 and s3 are detection targets, and they have characteristics of second order cyclic autocorrelation function (CAF). It is assumed that the signal s1 has periodicity of cyclic frequency $\alpha_1$, the signal s2 has periodicity of cyclic frequency $\alpha_2$, and the signal s3 has periodicity of cyclic frequency $\alpha_3$.

In step S1005, the test statistic calculation unit 75 calculates test statistic for a parameter of each of detection target signals in the same way as the first embodiment. The test statistic $Z^{\alpha 1}_n$ is calculated for the signal s1, the test statistic $Z^{\alpha 2}_n$ is calculated for the signal s2, and the test statistic $Z^{\alpha 3}_n$ is calculated for the signal s3, in which n indicates the number of times of iteration.

In step S1006, the signal decision unit 76 compares the test statistic with a threshold so as to determine whether a detection target signal is included in the received signal. In the before-mentioned concrete example, test statistics $Z^{\alpha 1}_n$, $Z^{\alpha 2}_n$, and $Z^{\alpha 3}_n$ are compared with the threshold Γ respectively to determine whether a detection target signal is included in the received signal. Then, when a test statistic exceeds the threshold, it is determined that a signal related to the test statistic is included in the same way as the first embodiment.

As an example, it is assumed that, at the first time in the iterative calculation, the test statistic $Z^{\alpha 1}_n$ of the signal s1 exceeds the threshold Γ but other test statistics are smaller than the threshold, as shown in the following.

$Z^{\alpha 1}_{n=1} \geq \Gamma$ $Z^{\alpha 2}_{n=1} < \Gamma$ $Z^{\alpha 3}_{n=1} < \Gamma$ In this case, the flow goes to step S1007.

In step S1007, the iterative detection control unit 77 sends a control signal to the test statistic calculation unit 75. The control signal indicates the effect of the already detected signal should be removed when the test statistic calculation unit 75 re-calculates the test statistic for each of the detection target signals. In this example, the iterative detection control unit 77 reports to the test statistic calculation unit 75 that the signal s1 has been detected. Then, the flow returns to step S1005.

In step S1005, the test statistic calculation unit 75 re-calculates the test statistic. In this example, test statistics $Z^{\alpha 2}_{n=2}$ and $Z^{\alpha 3}_{n=2}$ are re-calculated for the undetected signals s2 and s3 respectively. It is unnecessary to calculate test statistic $Z^{\alpha 1}_{n=2}$ for the detected signal s1. The re-calculated test statistics $Z^{\alpha 2}_{n=2}$ and $Z^{\alpha 3}_{n=2}$ do not include contribution of the already detected signal s1. For example, this calculation is performed by setting the contribution of the cyclic frequency $\alpha_1$ to be 0 when calculating covariance matrix elements. Since the test statistics $Z^{\alpha 2}$ and $Z^{\alpha 3}$ re-calculated in the above-mentioned way do not include the contribution of the detected signal, presence or absence of the undetected signals can be determined accurately. In step S1006, the signal decusion unit 76 compares the re-calculated test statistics $Z^{\alpha 2}_{n=2}$ and $Z^{\alpha 3}_{n=2}$ with the threshold Γ respectively. When a test statistic exceeds the threshold, it is determined that a signal related to the test statistic is included. After that, until no test statistic exceeding the threshold remains, processing of calculation S1005 of test statistic, determination S1006 of signal presence or absence, and removal S1007 of detected signals is iterated.

In the present example, null is directed to the direction of θ1. Therefore, the received signals include signals arriving from directions other than θ1, that is, from directions of θ2 and θ3. When signals arriving from θ2 and θ3 are different types of signals, each of the signal arriving from θ2 and the signal arriving from θ3 can be properly detected irrespective of reception level by using the method of the first embodiment (steps S1005-S1007).

On the other hand, when it is determined that no detection target signal is included in step S1006, the flow goes to step S1008. In step S1008, in the same way as the second embodiment, the iterative detection control unit 77 determines, for each of arrival directions estimated by the direction-of-arrival estimation unit 73, whether there remains a direction for which null has not yet been generated. When there remains a direction for which null has not yet been generated, weights used in the weight control unit are changed so as to generate null one of the directions, and processes after the step S1003 are performed iteratively.

In step S1008, when it is confirmed that generation of null completes for every arrival direction estimated by the direction-of-arrival estimation unit, only signals detected so far are determined to be included in the received signals, and detection processing ends (S1009).

As mentioned above, in the present modified example, effect of the once detected signal is removed iteratively even when performing detection operation in a state where arrival wave from a direction is suppressed. Accordingly, even when there are a plurality of signals arriving from directions in which null is not formed, the radio station can detect presence of signals being used around the radio station. The present modified example is particularly effective in a case where a plurality of signals arrive from the same direction or adjacent directions, and a case where a signal is received from a plurality of directions due to multipath reflection, and the like.

4. Fourth Embodiment

In the first to third embodiments, the strongest signal is detected first from among candidates of detection target signals. Then, test statistic is re-calculated under a condition where the detected candidate is removed, so that presence or absence of other candidates is determined based on the re-calculated test statistics. Accordingly, a signal which is difficult to detect due to detection target signals having strong power level can be accurately detected. However, according to this method, there are fears that long time is required until determination of presence or absence for all candidates completes and that calculation load required for detection increases as the number of candidates of the detection target signals increases. The fourth embodiment addresses such problems.

<4.1 Signal Detection Apparatus>

Figure 11:
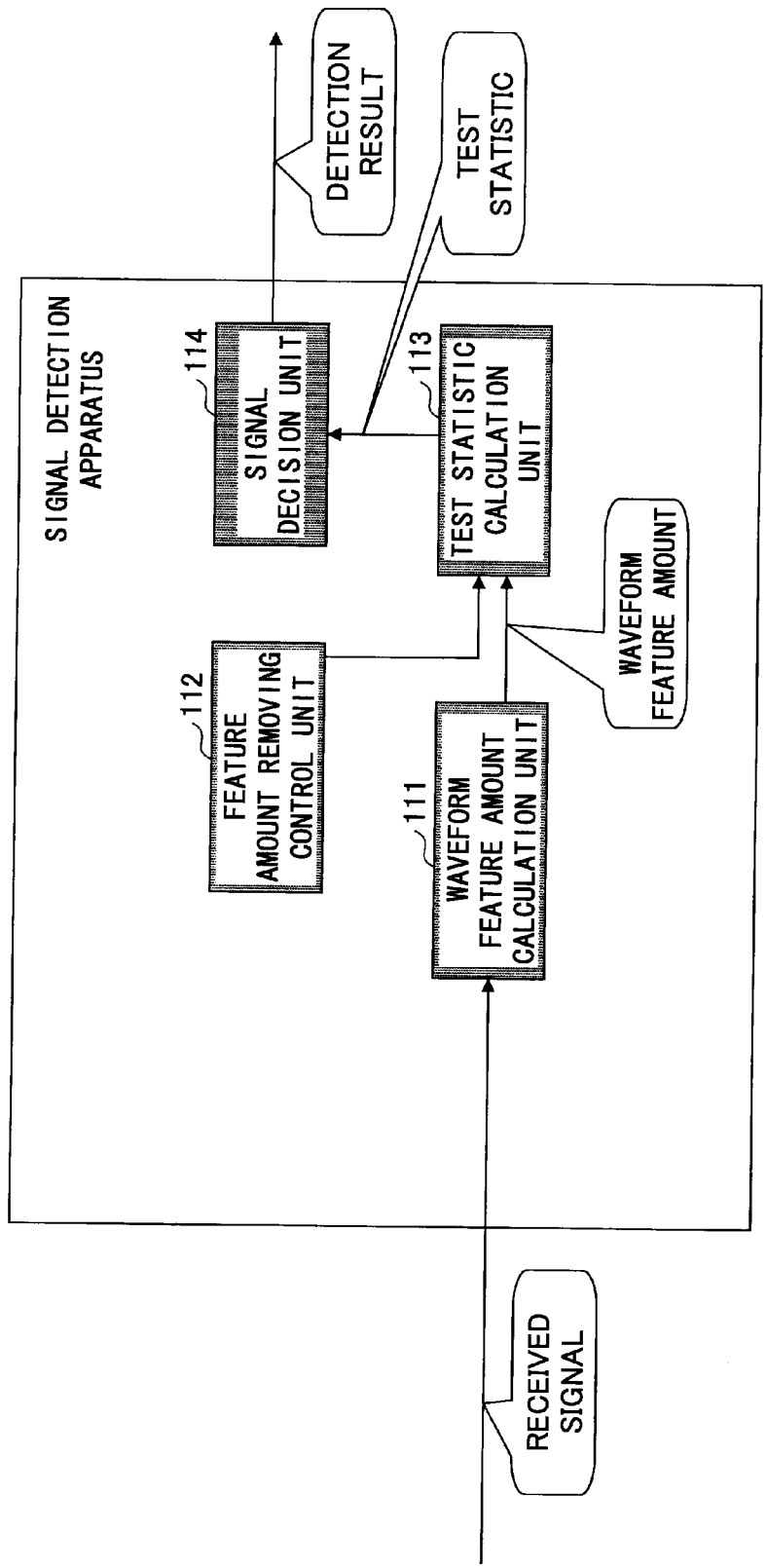
FIG. 11 is a block diagram of the radio station of a fourth embodiment of the present invention.

FIG. 11 shows a signal detection apparatus used in the fourth embodiment. Like the signal detection apparatus shown in FIG. 3, the signal detection apparatus shown in the figure includes a waveform feature amount calculation unit 111, a feature amount removing control unit 112, a test statistic calculation unit 113, and a signal decision unit 114.

The waveform feature amount calculation unit 111 calculates a waveform feature amount for a signal (that is the received signal) input to the antenna 21. The waveform feature amount is information on statistical characteristics of the signal waveform. As the feature amount, cyclostationarity obtained by a second order cyclic autocorrelation value, a variance value of signal amplitude, a frequency correlation value and the like may be utilized.

The feature amount removing control unit 112 reports, to the test statistic calculation unit 113, information of a signal (candidate of a detection target signal) that may be included in the radio received signals. For example, it is assumed that there are four types of candidates of detection target signals, and that cyclic frequencies of these are α1, α2, α3 and α4 respectively. In this case, the feature amount removing control unit 112 reports to the test statistic calculation unit 113 that cyclic frequencies of the four candidates are α1, α2, α3 and α4 respectively. Information of the candidates of the detection target signals may be stored in the radio station beforehand, or may be specified from signals broadcasted by the base station of the residing cell.

The test statistic calculation unit 113 calculates the test statistic by using a value of the waveform feature amount obtained in the waveform feature amount calculation unit 111. The test statistic is an amount for determining whether a detection target signal is included in the received signal. In the present embodiment, when calculating test statistic for a specific candidate in candidates of detection target signals, signals other than the specific candidate have been removed from the radio received signal. Details of operation are described later.

The signal decision unit 114 compares the value of the test statistic obtained by the test statistic calculation unit 113 with a predetermined threshold r so as to determine whether the detection target signal is included in the signal input to the antenna.

<4.2 Operation>

Figure 12:
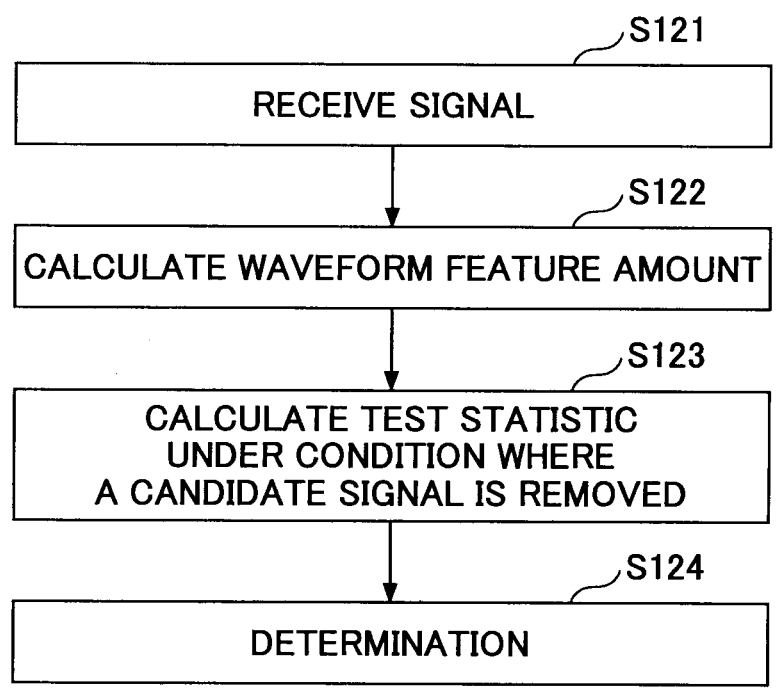
FIG. 12 is a flowchart showing operation of the signal detection apparatus of the fourth embodiment of the present invention.

FIG. 12 is a flowchart showing operation of the signal detection apparatus. In step S121, the signal x(t) is received via the antenna of the radio station. The received signal x(t) includes a detection target signal of the radio station. For example, it is assumed that M types of signals S1, S2, ..., SM are detection target signals. For the sake of convenience of explanation, M=4.

In step S122, the waveform feature amount calculation unit 111 calculates the waveform feature amount of the received signal. In the present embodiment, the detection target signals have characteristics of second order cyclic autocorrelation function (CAF). The signal s1 has periodicity of cyclic frequency $\alpha_1$, the signal s2 has periodicity of cyclic frequency $\alpha_2$, the signal s3 has periodicity of cyclic frequency $\alpha_3$, and the signal s4 has periodicity of cyclic frequency $\alpha_4$.

In step S123, the test statistic calculation unit 113 calculates test statistic $Z^\alpha$ for a parameter (cyclic frequency, more particular) of each of detection target signals. In the case of the present embodiment, the test static calculation unit 113 has received information on candidates of detection target signals. In the present example, the test statistic calculation unit 113 has received a report that there are four types of candidates of detection target signals and that cyclic frequencies of them are α1, α2, α3 and α4 respectively.

The test statistic $Z^{\alpha 1}$ on the first candidate s1 in which the cyclic frequency is α1 is calculated under a condition where other candidates are removed from the radio received signal. For example, a notch filter for suppressing signals of cyclic frequency α2, α3 and α4 is applied on the radio received signal, so that test statistic for the first candidate is calculated using the signal on which the notch filter has been applied. The notch filter is realized as a band-elimination filter to eliminate specific cyclic frequency components, and has filter characteristics shown by the following equation as an example.

$$W_{mod}^{\alpha_m}[s] = \begin{cases} W[s] & \text{if } \alpha = \alpha_m (s=0) \text{ or } \alpha \neq \alpha_M (s \neq K) \\ 0 & \text{else} \end{cases}$$

In the equation, "s" indicates a frequency belonging to a window of FFT/IFFT having length L, α indicates a cyclic frequency, $\alpha_m$ indicates a cyclic frequency of a candidate of a target, and $\alpha_M$ indicates a cyclic frequency of candidate other than the target candidate. K represents an index of a spectrum window coefficient corresponding to $\alpha_M$.

Figure 13:
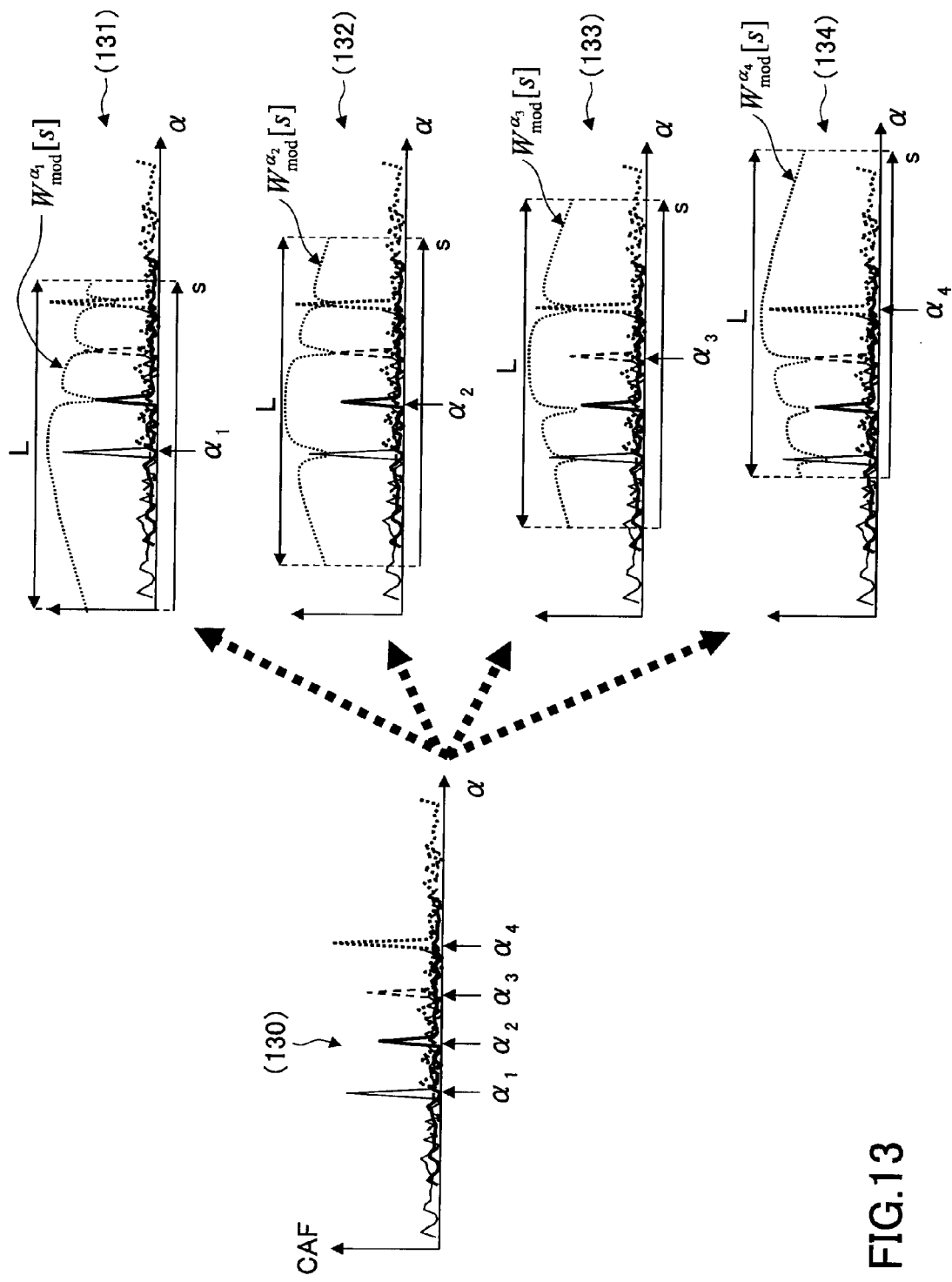
FIG. 13 is a diagram showing a manner in which the test statistic is calculated for each of candidates of targets in the fourth embodiment.

FIG. 13 shows a manner in which the test statistic is calculated for each of candidates of targets in step S123. The graph (130) of the left side shows a manner in which four candidates s1, s2, s3 and s4 having cyclic frequencies of α1, α2, α3 and α4 respectively are mixed in the received signal. Such a graph is obtained by calculating autocorrelation of signals having specific cyclic frequencies. The first graph (131) of the right side shows a situation in which a notch filter $W_{mod}^{\alpha 1}[s]$ for the first candidate is applied to the received signal. As shown in the figure, the property of the notch filter takes a value W[s] which is not 0 when α=α1 (s=0) or α≠α2, α3, α4, and it becomes 0 when α is any of cyclic frequencies α2, α3 and α4 of the other candidates. Therefore, the received signal on which the notch filter has been applied includes the first candidate s1, but does not include other candidates S2, S3 and S4 effectively. Therefore, based on the signal, the test statistic $Z^{\alpha 1}$ calculated on the first candidate s1 clearly represents presence or absence of the first candidate.

Similarly, the second graph (132) of the right side shows a situation in which a notch filter $W_{mod}^{\alpha 2}[s]$ for the second candidate is applied to the received signal. The property of the notch filter takes a value W[s] which is not 0 when α=α2 (s=0) or α≠α1, α3, α4, and it becomes 0 when α is any of cyclic frequencies α1, α3 and α4 of the other candidates.

Therefore, the received signal on which the notch filter has been applied includes the second candidate s2, but does not include other candidates S1, S3 and S4 effectively. Therefore, based on the signal, the test statistic $Z^{\alpha 2}$ calculated on the second candidate s2 clearly represents presence or absence of the second candidate.

Similarly, the third graph (133) of the right side shows a situation in which a notch filter $W_{mod}^{\alpha 3}[s]$ for the third candidate is applied to the received signal. The property of the notch filter takes a value W[s] which is not 0 when $\alpha=\alpha 3$ (s=0) or $\alpha \neq \alpha 1$, $\alpha 2$, $\alpha 4$, and it becomes 0 when $\alpha$ is any of cyclic frequencies $\alpha 1$, $\alpha 2$ and $\alpha 4$ of the other candidates. Therefore, the received signal on which the notch filter has been applied includes the third candidate s3, but does not include other candidates S1, S2 and S4 effectively. Therefore, based on the signal, the test statistic $Z^{\alpha 3}$ calculated on the third candidate s3 clearly represents presence or absence of the third candidate.

Then, the fourth graph (134) of the right side shows a situation in which a notch filter $W_{mod}^{\alpha 4}[s]$ for the fourth candidate is applied to the received signal. As shown in the figure, the property of the notch filter takes a value W[s] which is not 0 when $\alpha=\alpha 4$ (s=0) or $\alpha \neq \alpha 1$, $\alpha 2$, $\alpha 3$, and it becomes 0 when $\alpha$ is any of cyclic frequencies $\alpha 1$, $\alpha 2$ and $\alpha 3$ of the other candidates. Therefore, the received signal on which the notch filter has been applied includes the fourth candidate s4, but does not include other candidates S1, S2 and S3 effectively. Therefore, based on the signal, the test statistic $Z^{\alpha 4}$ calculated on the fourth candidate s4 clearly represents presence or absence of the fourth candidate.

In step S124 shown in FIG. 12, presence or absence of each candidate is determined based on test statistics $Z^{\alpha 1}$, $Z^{\alpha 2}$, $Z^{\alpha 3}$ and $Z^{\alpha 4}$ calculated for the first to fourth candidates respectively. It must be noted that calculating presence or absence of a candidate by calculating test statistic for a candidate is independent of calculating presence or absence of another candidate by calculating test statistic for another candidate. That is, the test statistics $Z^{\alpha 1}$, $Z^{\alpha 2}$, $Z^{\alpha 3}$ and $Z^{\alpha 4}$ for the first to fourth candidates respectively may be calculated one by one in order, or may be calculated in parallel at the same time.

For the sake of convenience of explanation, although the notch filter is used in the above-mentioned example, any appropriate filter may be used for passing a frequency component and eliminating another frequency component. For example, a band-pass filter may be used instead of the band-elimination filter such as the notch filter. In addition, a combination of the band-elimination filter and the band-pass filter may be used.

In the processing for removing a signal component included in the received signal, if frequencies included in the received signal are different with each other, a specific signal can be removed from the received signal by using a filter for eliminating the frequency of the specific signal. However, in that case, information of center frequency, bandwidth, frequency offset and the like is necessary for the signal to be removed. In addition, when bands of a plurality of signals overlap, it is difficult to remove only a specific signal. On the other hand, by using the cyclic autocorrelation function like the embodiment of the present invention, signal detection can be performed while removing the cyclic frequency component (that is, the peak) of a specific signal. According to this method, even though a plurality of signals are included in the received signal, if values of the cyclic frequencies (appearing positions of peaks) are different, the signal can be removed accurately from the received signal.

<4.3 Comparison of Operation>

Processing of the first embodiment and processing of the fourth embodiment are compared. FIG. 14 schematically shows processing by the first embodiment. Like the case of FIG. 13, it is assumed that four candidates are mixed in the received signal. Also, it is assumed that the fourth candidate is the strongest in the four candidates. In this case, in step S141, the fourth candidate having the cyclic frequency of $\alpha 4$ is detected first. Then, under the condition in which the fourth candidate is removed, test statistic is re-calculated for other candidates. It is assumed that the first candidate is the strongest in the remaining three candidates. In this case, in step S142, the first candidate having cyclic frequency of $\alpha 1$ is detected. Then, under the condition in which the fourth and the first candidates are removed, test statistic is re-calculated for other candidates. It is assumed that the third candidate is stronger in the remaining two candidates. In this case, in step S143, the third candidate having cyclic frequency of a3 is detected. Then, under the condition in which the fourth, first and third candidates are removed, test statistic is re-calculated for remaining candidate. Then, in step S144, the second candidate having cyclic frequency of $\alpha 2$ is detected. When there is no undetected candidate like this example, or, when significant peak is not detected, the processing ends.

As mentioned above, in the case of the first embodiment, it is necessary to calculate test statistics $Z^{\alpha 1}$-$Z^{\alpha 4}$ for the four candidates respectively before step S141, calculate test statistics $Z^{\alpha 1}$-$Z^{\alpha 3}$ for the three candidates respectively before step S142, calculate test statistics $Z^{\alpha 2}$ and $Z^{\alpha 3}$ for the two candidates respectively before step S143, and calculate test statistic $Z^{\alpha 2}$ before step S144. Therefore, when the number of candidates is four, it is necessary to perform calculation of test statistics ten times. In general, when the number of candidates is N, the number of times of calculation of the test statistics becomes N(N+1)/2 which is vary large. On the other hand, in the case of the fourth embodiment, as shown in FIG. 13, the number of times of calculation of the test statistics is the number of the candidates at most. In the example of FIG. 13, it is only necessary to calculate four test statistics $Z^{\alpha 1}$-$Z^{\alpha 4}$ for the first to fourth candidates respectively. Accordingly, the fourth embodiment is preferable from the viewpoint for reducing calculation load.

In the following, examples of configurations based on the present invention are described.

According to an embodiment of the present invention, a signal detection apparatus (23, 73) in a radio station of a radio communication system is used. The signal detection apparatus includes a waveform feature amount calculation unit (31, 74) configured to receive a radio signal and to calculate a waveform feature amount representing a waveform feature of the radio signal; a test statistic calculation unit (32, 35) configured to calculate test statistic based on calculation result of the waveform feature amount calculation unit; a signal decision unit (33, 76) configured to determine presence or absence of a signal having statistical feature by comparing calculation result of the test statistic calculation unit with a threshold; and an iterative detection control unit (34, 77) configured to control operation of signal detection processing based on the decision result of the signal decision unit. By iterating detection processing while considering the result detected for a signal having large received power, it becomes possible to detect a signal having small received power accurately.

In the signal detection apparatus, when the signal decision unit detects one or more signals having statistical feature, the iterative detection control unit controls the test statistic calculation unit to change calculation process of test statistic such that waveform feature amount of the detected signals is not considered, and to re-calculate test statistic. As a result, it becomes possible to perform detection processing for a signal of small received power while eliminating effect of a signal of large received power.

The signal detection apparatus further includes: a weight control unit (71) configured to assign weights to each of signals received by a plurality of antennas of the radio station; a signal adding unit (72) configured to add signals weighted by the weight control unit; and a direction-of-arrival estimation unit (73) configured to estimate an arrival direction based on the added signal and weight values used in the weight control unit. When the signal decision unit detects one or more signals having statistical feature, the iterative detection control unit controls weight values of the weight control unit, based on the estimation result of the direction-of-arrival estimation unit, so as to generate null in one or more estimated arrival directions, and the iterative detection control unit iterates calculation processing in the waveform feature amount calculation unit and the test statistic calculation unit for the signal added in the signal adding unit, so that a plurality of signals are separated for each arrival direction. Thus, it becomes possible to detect a signal arriving from a direction without receiving effect of a signal arriving from other directions.

When the signal decision unit detects one or more signals having statistical feature, the iterative detection control unit controls weight values of the weight control unit, based on the estimation result of the direction-of-arrival estimation unit, so as to generate null in one or more estimated arrival directions, and the iterative detection control unit iterates calculation processing in the waveform feature amount calculation unit and the test statistic calculation unit for the signal added in the signal adding unit. When the signal decision unit detects one or more signals having statistical feature again, the iterative detection control unit controls the test statistic calculation unit to change covariance and calculation process of the test statistics such that waveform feature amount of the detected signal is not considered, and to calculate the test statistic again. Accordingly, it becomes possible to perform detection processing for a signal of small received power while eliminating effect of a signal of large received power even in an environment in which a plurality of signals arrive from a direction simultaneously.

An embodiment of the present invention may be also configured as a signal detection method in a radio station of a radio communication system. The signal detection method includes: a waveform feature amount calculation step of receiving a radio signal and calculating a waveform feature amount representing a waveform feature of the radio signal; a test statistic calculation step of calculating test statistic based on calculation result of the waveform feature amount calculation step; a signal decision step of determining presence or absence of a signal having statistical feature by comparing calculation result of the test statistic calculation step with a threshold; and an iterative detection control step of controlling operation of signal detection processing based on the decision result of the signal decision step.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. While specific equation examples are used to facilitate understanding of the present invention, such equations are merely examples, so that any appropriate equation may be used unless specified otherwise. Classification into each embodiment or item in the description is not essential in the present invention, and features described in equal to or more than two embodiments or items may be combined and used as necessary. Also, a feature described in an embodiment or item may be applied to a feature described in another embodiment or item (as long as they are not contradict). For convenience of explanation, while the apparatus according to the embodiments of the present invention is explained using functional block diagrams, such an apparatus as described above may be implemented in hardware, software, or a combination thereof. Software may be provided in a random access memory (RAM), a flash memory, a read-only memory (ROM), an EPROM, an EEPROM, a register, a hard disk (HDD), a removable disk, a CD-ROM, and any other appropriate storage medium. The present invention is not limited to the above embodiments, so that variations, modifications, alternatives, and replacements are included in the present invention without departing from the spirit of the present invention.

The present application is based on Japanese Priority Patent Application No. 2010-2293 filed Jan. 7, 2010, with the Japanese Patent Office, and Japanese Priority Patent Application No. 2010-158926 filed Jul. 13, 2010, with the Japanese Patent Office, the entire contents of which are hereby incorporated herein by reference.

What is claimed is:

1. A signal detection apparatus for determining whether a detection target signal is included in a received radio signal, comprising:
    a waveform feature amount calculation unit configured to calculate a waveform feature amount representing a waveform feature for each detection target signal;
    a test statistic calculation unit configured to calculate test statistic of each detection target signal by using the waveform feature amount; and
    a signal decision unit configured to determine presence or absence of each detection target signal by comparing the test statistic of each detection target signal with a threshold,
    wherein, under a condition where a specific detection target signal is removed, the test statistic calculation unit calculates a test statistic for a detection target signal which is not removed, and the signal decision unit determines presence or absence of the detection target signal by comparing the calculated test statistic with the threshold.

2. The signal detection apparatus as claimed in claim 1, wherein the waveform feature amount is represented by a second order cyclic autocorrelation function specified by a frequency parameter which indicates a cyclic frequency.

3. The signal detection apparatus as claimed in claim 2, wherein the test statistic calculation unit calculates a series over a predetermined frequency range including a frequency parameter of each detection target signal by using the waveform feature amount so as to calculate the test statistic for each detection target signal.

4. The signal detection apparatus as claimed in claim 3, wherein,
    when the signal decision unit detects presence of a first detection target signal, but does not detect presence of a second detection target signal, the test statistic calculation unit re-calculates the series over the predetermined frequency range from which the first frequency parameter has been removed so as to re-calculate the test statistic of the second detection target signal, and the signal decision unit determines presence or absence of the second detection target signal by comparing the re-calculated test statistic with the threshold.

5. The signal detection apparatus as claimed in claim 3, wherein a specific detection target signal having a specific cyclic frequency component is removed from the radio signal based on autocorrelation of the specific detection target signal.

6. The signal detection apparatus as claimed in claim 5, wherein the test statistic calculation unit calculates the test statistic for a first candidate under a condition where signals other than the first candidate of the detection target signal are removed from the radio signal, and the test statistic calculation unit calculates the test statistic for a second candidate under a condition where signals other than the second candidate of the detection target signal are removed from the radio signal, and
the signal decision unit determines presence or absence of the first candidate and presence or absence of the second candidate.

7. The signal detection apparatus as claimed in claim 1, wherein the test statistic of a frequency parameter is calculated from a vector having a waveform feature amount specified by the frequency parameter and from a covariance matrix for the vector.

8. The signal detection apparatus as claimed in claim 1, further comprising a directivity control unit configured to control directivity for receiving the radio signal.

9. The signal detection apparatus as claimed in claim 8, further comprising a direction-of-arrival estimation unit configured to estimate an arrival direction of the radio signal.

10. The signal detection apparatus as claimed in claim 8, wherein the signal detection apparatus performs, for each of a plurality of arrival directions of the radio signal,
processing for realizing directivity having null in a direction by the directivity control unit,
processing for calculating test statistic by the test statistic calculation unit, and
processing for determining presence or absence of the detection target signal by the signal decision unit.

11. The signal detection apparatus as claimed in claim 10, wherein the signal detection apparatus iteratively performs processing for calculating test statistic and processing for determining presence or absence of the detection target signal under a condition where a detection target signal whose presence has been detected is removed.

12. The signal detection apparatus as claimed in claim 1, wherein the signal decision unit determines presence or absence of the detection target signal by using a likelihood ratio test method.

13. A signal detection method for determining whether a detection target signal is included in a received radio signal, comprising the steps of:
calculating a waveform feature amount representing a waveform feature for each detection target signal;
calculating test statistic of each detection target signal by using the waveform feature amount; and
determining presence or absence of each detection target signal by comparing the test statistic of each detection target signal with a threshold,
wherein, under a condition where a specific detection target signal is removed, presence or absence of the detection target signal is determined by calculating a test statistic for a detection target signal which is not removed and by comparing the calculated test statistic with the threshold.

14. The signal detection method as claimed in claim 13, wherein the waveform feature amount is represented by a second order cyclic autocorrelation function specified by a frequency parameter which indicates a cyclic frequency.

15. The signal detection method as claimed in claim 14, wherein the step of calculating the test statistic includes calculating a series over a predetermined frequency range including a frequency parameter of each detection target signal by using the waveform feature amount so as to calculate the test statistic for each detection target signal.

16. The signal detection method as claimed in claim 15, wherein,
when presence of a first detection target signal is detected, but presence of a second detection target signal is not detected, the test statistic of the second detection target signal is re-calculated by re-calculates the series over the predetermined frequency range from which the first frequency parameter has been removed, and presence or absence of the second detection target signal is determined by comparing the re-calculated test statistic with the threshold.

17. The signal detection method as claimed in claim 15, wherein a specific detection target signal having a specific cyclic frequency component is removed from the radio signal based on autocorrelation of the specific detection target signal.

18. The signal detection method as claimed in claim 17, wherein the step of calculating the test statistic includes calculating the test statistic for a first candidate under a condition where signals other than the first candidate of the detection target signal are removed from the radio signal, and calculating the test statistic for a second candidate under a condition where signals other than the second candidate of the detection target signal are removed from the radio signal, and
presence or absence of the first candidate and presence or absence of the second candidate are determined in the step of determining.

19. The signal detection method as claimed in claim 13, wherein the test statistic of a frequency parameter is calculated from a vector having a waveform feature amount specified by the frequency parameter and from a covariance matrix for the vector.

20. The signal detection method as claimed in claim 13, further comprising a step of controlling directivity for receiving the radio signal before calculating the waveform feature amount.

21. The signal detection method as claimed in claim 20, further comprising a step of estimating an arrival direction of the radio signal before controlling the directivity.

22. The signal detection method as claimed in claim 20, wherein the signal detection method performs, for each of a plurality of arrival directions of the radio signal,
the step of controlling the directivity,
the step of calculating test statistic, and
the step of determining presence or absence of the detection target signal.

23. The signal detection method as claimed in claim 22, wherein processing for calculating test statistic and processing for determining presence or absence of the detection target signal are performed iteratively under a condition where a detection target signal whose presence has been detected is removed.

24. The signal detection method as claimed in claim 13, wherein the step of determining includes determining presence or absence of the detection target signal by using a likelihood ratio test method.

* * * * *